United States Patent [19]

Goldstein et al.

[11] Patent Number: 4,458,398
[45] Date of Patent: Jul. 10, 1984

[54] MANUFACTURING APPARATUS FOR ADJUSTING THE POSITION OF A MAGNETIC HEAD IN A FLEXIBLE DISK DRIVE

[75] Inventors: Andrew D. Goldstein, Boulder; Kim E. Russell; Arthur W. Scott, both of Longmont, all of Colo.

[73] Assignee: International Business Machines Corporation, Armonk, N.Y.

[21] Appl. No.: 393,964

[22] Filed: Jun. 30, 1982

[51] Int. Cl.³ .......................................... B23Q 15/00
[52] U.S. Cl. .................................. 29/33 R; 360/104; 360/109
[58] Field of Search ............... 29/33 R, 729, 834, 841; 360/75, 76, 97, 104, 109, 31, 128; 369/43

[56] References Cited

U.S. PATENT DOCUMENTS 3,670,113  6/1972  Bragas ........................... 360/75 X
4,097,908  6/1978  Chou et al. ....................... 360/76

FOREIGN PATENT DOCUMENTS 55-117324   9/1981  Japan ............................. 360/104
55-169219  12/1981  Japan ............................. 360/109
1533778    11/1978  United Kingdom .
2097171    10/1982  United Kingdom ............... 360/104
775751     10/1980  U.S.S.R. ........................... 360/128

OTHER PUBLICATIONS

IBM Bulletin vol. 21, No. 12 May 1979 "Bail Adj. Mech." pp. 4969-4972.
IBM Bulletin vol. 17, No. 12 May 1975 "Precision Mounting of Magnetic Read Heads.," pp. 3703-3705.
IBM Bulletin vol. 26, No. 2, Jul. 1983, pp. 821-823, Schmidt et al., "Magnetic Rec. Head Alignment Fixture".
Western Electric Technical Digest No. 67, Jul. 1982, p. 5, Magnetic Head Aligning Fixture.
IBM Technical Disclosure Bulletin, vol. 16, No. 4, Sep. 1973, "Magnetic Head Position Sensing," by N. B. Taylor, pp. 1338-1340.
IBM Technical Disclosure Bulletin, vol. 20, No. 5, Oct. 1977, "Read/Write Magnetic Azimuth Adjustment Method," by R. G. Hart et al., pp. 1897-1901.

Primary Examiner—William R. Briggs
Attorney, Agent, or Firm—Francis A. Sirr

[57] ABSTRACT

During manufacture of a flexible disk drive, the drive's head is located in its penetration direction, and then in radial, azimuth, tangential, roll and pitch attitudes by reading a test disk, as the head is held by a robotic head holder/manipulator. The head's signal produces closed-loop control of a serially-stacked array of rotary and linear motors which position the holder/manipulator. After the head is properly adjusted, it is clamped to the disk drive's head carriage.

11 Claims, 21 Drawing Figures

FIG. 1
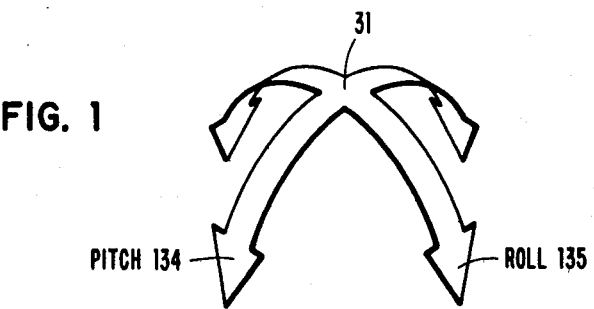
PITCH 134 — ROLL 135
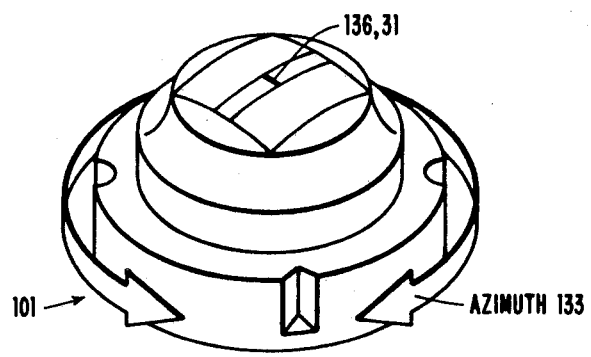
136, 31
101 — AZIMUTH 133
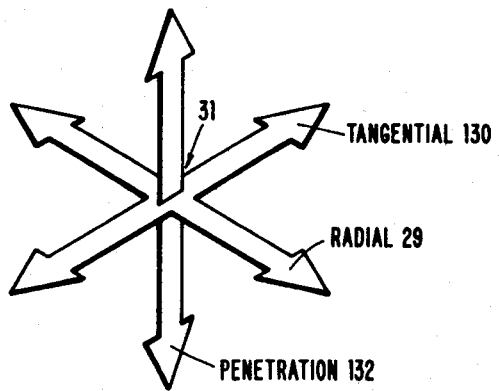
TANGENTIAL 130
RADIAL 29
PENETRATION 132

MANUFACTURING APPARATUS FOR ADJUSTING THE POSITION OF A MAGNETIC HEAD IN A FLEXIBLE DISK DRIVE

Cross Reference to Other Applications

Application Ser. No. 391,058, filed June 22, 1982, "Manufacturing Method and Apparatus for Adjusting the Position of a Magnetic Head in a Flexible Disk Drive", by Paul M. Charlson, Richard H. Estry and Clarence R. Schwieters.

Application Ser. No. 433,618, filed Oct. 12, 1982, "Manufacturing Apparatus for Adjusting the Position of a Magnetic Head in a Flexible Disk Drive", by Holger J. Baasch, Ross W. Bishop, Paul M. Charlson, James G. Hunzeker and Clarence R. Schwieters.

Technical Field

This invention relates to the field of dynamic magnetic information storage or retrieval by the use of a flexible disk, and more specifically to the adjustment of a disk drive's magnetic head, relative to a circular data track carried by the flexible disk, during manufacture of the disk drive.

Background of the Invention

In the art of flexible diskette drives it is known that six position parameters of the drive's magnetic head gap(s) must be considered during manufacture of the drive. These six parameters, with reference to FIG. 1, are: penetration of the head into the plane of the rotating disk; the radial position of the head along a fixed-position radius of the disk; the tangential position of the head along a line which is tangent to a circular data track carried by the disk at the point of intersection of the fixed-position radius and the center line of the data track; the azimuth rotation of the head about an axis normal to the plane of the disk; the pitch rotation of the head about an axis parallel to the fixed-position radius; and the roll rotation of the head about an axis parallel to the aforementioned tangent line.

For example, the head's linear gap may lie on the fixed-position radius and be parallel thereto, may be centered on the tangent line, should have a pitch attitude which produces a desired distance relationship between the gap and the disk's magnetic recording surface (for example, in-contact), and should have a roll attitude which produces a constant spacing between the gap and the disk, along the gap's width (i.e., the gap dimension which is parallel to the fixed-position radius).

The need to control the head's position parameters has led to a number of prior art innovations.

U.S. Pat. No. 4,097,908 discloses a method of inspecting the azimuth parameter of a flexible disk drive's head, and thereafter relocating the head-positioning mechanism so as to minimize azimuth error. In the method of this patent a master disk is provided which includes an inner track having bits of information recorded at predetermined acute angles relative to the disk radius. This data track is read by the disk drive's head. The head's output signal is monitored on an oscilloscope and compared to a predetermined signal waveform that corresponds to the head gap being substantially parallel to the disk radius. This comparison can then be used to relocate the disk drive's head-positioning mechanism.

This patent also recognizes that in prior art optical head alignment techniques it was known to align the head's gap before the head was cemented or glued into position in the head's lead-screw carriage.

The *IBM Technical Disclosure Bulletin* of October 1977, at pages 1897 through 1901, describes a similar azimuth adjustment method for the head of a disk drive. In this arrangement the master disk is made by the use of two magnetic heads. A first of these heads writes the circular data track. This first head is visually located with its gap accurately on the disk's radius. The head is then arcuately adjusted in order to write the data track's bits of information at predetermined acute angles. The second head, which is a read head, reads this data track. The second head's output signal is used to monitor and control the writing of the data track by the first head; that is, the first head is adjusted until the signal output of the second head is proper.

The *IBM Technical Disclosure Bulletin* of September 1973, at pages 1338 through 1340, teaches the use of a test disk to determine the radial position of a disk drive's head. This arrangement also uses a master disk. In this case the master disk is provided with a number of accurately located data tracks, each one of which comprises groupings of two sync bits, centered on the track, followed by bits which are positioned a known distance on opposite sides of the track center. The disk drive's head will produce generally equal output signals from the sync bits, independent of the head's radial position. However, the signal produced by the following off-center bits will be of equal amplitude only when the head gap is centered on the data track.

United Kingdom Pat. No. 1,533,778 also deals with a test disk for facilitating radial adjustment and mentions azimuth adjustment.

SUMMARY OF THE INVENTION

The present invention forms a portion of an apparatus for adjusting the aforesaid head position parameters of a flexible disk drive during manufacture of the drive.

This manufacturing apparatus physically supports the disk drive undergoing manufacture and adjustment. The drive's head is loosely positioned in the drive's head carriage. A robotic type holder/manipulator grips and movably supports the head slightly spaced from the drive's head carriage. This space contains an inactive glue or cement which will be activated, for example by injection of a catalyst or by ultraviolet light, but only after the head's position has been properly adjusted.

A master flexible disk, of the general type aforesaid, is mounted to the spindle of this disk drive. As such, the master disk occupies the same general space which will be occupied by all data disks subsequently used in the disk drive after manufacture of the drive. This master disk includes an adjustment data track located at, for example, track 22 of a 45-track format.

The present invention provides circuit means for interrogating the master disk's data track signal, and provides an output signal which controls the aforesaid tangent, radial and azimuth head adjustment.

Penetration Adjustment

Penetration of the aforesaid head into the plane of the master disk is accomplished open loop (i.e. no signal is read from the master disk) in that relative movement of the holder/manipulator, and thereby the head and the disk, continues until a datum surface of the disk drive is encountered. Since the drive's spindle has previously been accurately located relative this same datum, the head now penetrates the plane of the disk by a known distance.

At this time the master disk may or may not be rotating. However, after penetration has been achieved, the disk rotates at its operational speed in preparation for subsequent adjustment.

Rotation of the master disk can be accomplished either by the drive's spindle motor, or by an apparatus-mounted motor.

The sequence of the remaining head adjustment parameters is not critical to the present invention; however, the following sequence is preferred. In all cases, FIG. 2's data tracks 24–28 (located at disk-track 22 of the master disk) is monitored to achieve head adjustment.

Radial Adjustment

The head signal is monitored in order to center the head gap on the center line 20 of disk-track 22. A first bidirectional linear motor is located to produce head motion which is linear and coincident with a fixed-position disk radius. Closed-loop control of this linear motor, as a function of the head signal, positions the holder/manipulator, and the head gap, such that the center of the head gap is coincident with the center line 20 of track 22.

Azimuth Adjustment

The head is operable to read the master disk's data track and the head signal is operable to closed-loop control a first bidirectional rotary motor whose axis of rotation is perpendicular to the plane of the disk, and intersects the point 31 where the center of track 22 intersects the aforementioned fixed-position disk radius 29. Closed-loop control of this rotary motor positions the holder/manipulator and the head gap parallel to this disk radius.

Tangential Adjustment

The head signal is monitored in order to measure the time of occurrence of a unique signal 24 carried by the data track. The instantaneous rotational position of the master disk is known, as by reading a position transducer 23 carried by the disk rotation motor, or by reading a tachometer track 23 carried, for example, on the opposite side of the master disk from the data track.

In any event, the time of occurrence of this unique disk-carried signal 24, at the location of the head gap, is used to closed-loop control a second bidirectional linear motor whose movement produces movement of the head coincident with a line which is tangent to the center of track 22 at the point where the center of this track intersects the fixed-position disk radius. Closed-loop control of this linear motor positions the holder/manipulator and the head gap at the desired position 31 along this target line, relative this disk radius, for example coincident therewith.

In FIG. 2 the circular track's center line 20 is shown as a straight line. Thus, the aforesaid tangent line and center line 20 coincide in FIG. 2.

Roll Adjustment

The head signal is monitored in order to produce a constant distance relationship between opposite ends of the head gap (the gap dimension parallel to fixed-position disk radius 29) and opposite sides of track 22 (also measured along this disk radius).

A second bidirectional rotary motor is provided whose axis of rotation is coincident with the aforesaid tangent line. This motor is closed-loop controlled in order to position the holder/manipulator and the head gap with the aforesaid constant distance relationship.

Pitch Adjustment

At this time the head gap is very accurately positioned relative track 22. However, the head signal can be maximized by pitch adjustment.

A third bidirectional rotary motor is provided whose axis of rotation is coincident with fixed-position disk radius 29. This motor is closed-loop controlled to maximize the head signal by movement of the holder/manipulator and thereby the head gap.

Clamp Head

As a final step, the now-positioned head is clamped in permanent operating relationship to the disk drive's head carriage. In a preferred embodiment, a cement or glue is activated, and the master disk is maintained in rotation until the glue sets. Thereafter, all head signals are checked to ensure that the head has not shifted during clamping of the head.

The features and advantages of the invention will be apparent from the following more particular description of preferred embodiments of the invention, as illustrated in the accompanying drawing.

BRIEF DESCRIPTION OF THE DRAWINGS

FIG. 1 shows the head of a flexible disk drive, and the six position parameters which are adjusted in accordance with the present invention;

In FIGS. 9–11 the head holder/manipulator is not shown, in order to simplify the views;

DESCRIPTION OF THE PREFERRED EMBODIMENTS

Figure 2:
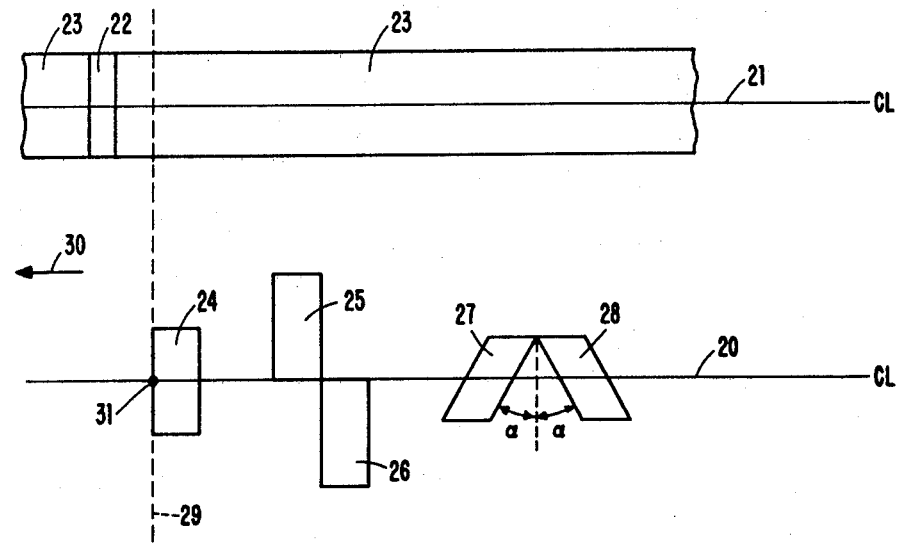
FIG. 2 shows the present invention's master disk alignment-data-track 20, as this track bears a known position relationship to a disk-position track 21,22.

FIG. 1 shows head 101 which is to be adjusted in the six disclosed position parameters.

Arrows, lines or axes 29, 130 and 132 are orthogonal. Radial line 29 and tangent line 130 lie in the plane of the aforesaid master disk, and the intersection of these lines is the point 31 which lies on the center line of the master disk's alignment data track. Penetration line 132 is perpendicular to the plane of the disk and intersects lines 29 and 130 at point 31.

Azimuth rotation of head 101 is represented by arrow 133. The plane of this rotation is parallel to the plane of lines 29 and 130.

Roll rotation of head 101 is represented by arrow 135. The plane of this rotation includes head gap 136. The plane of roll rotation also includes radius axes 29.

Pitch rotation of head 101 is represented by arrow 134. The plane of this rotation is perpendicular to the plane containing roll rotation 135 and gap 136. The plane of pitch rotation includes tangential axes 130.

The intersection of roll arrow 135 and pitch arrow 134 is also point 31. All six of these head motion parameters are related to a point 31 in space to which head gap 136 is to be aligned.

FIG. 2 shows center line 20 of the master disk's head alignment data track, and the center line 21 of a position transducer (tachometer) track which bears a known position relationship to the data track. It is to be understood that the data track is circular. Thus, center line 20 is actually a circle. However, for purposes of this explanation the track is shown as a straight line. In addition, the position transducer track may be carried on the disk itself, or alternatively, it may be carried by a tachometer which is driven by the motor which in turn drives the master disk.

Figure 17:
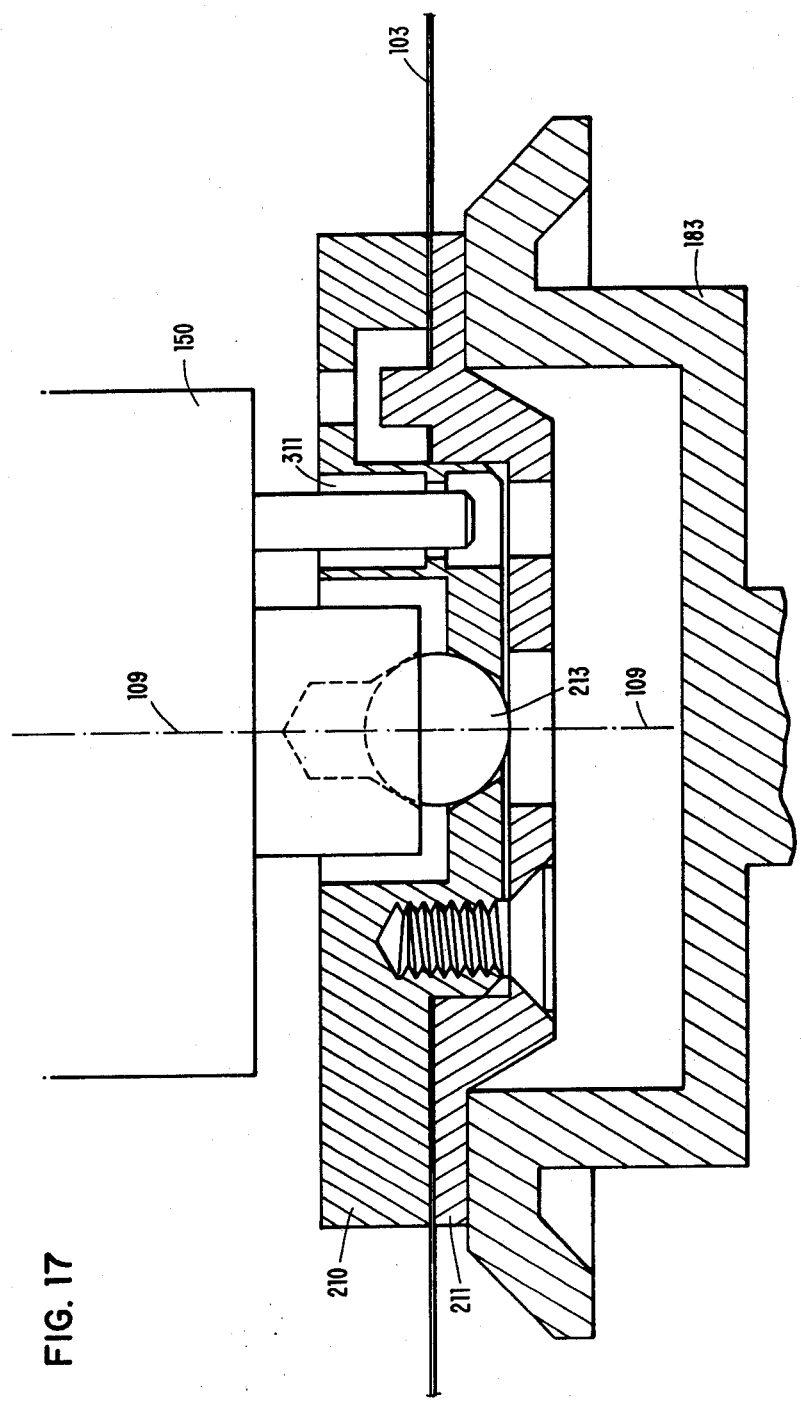
FIG. 17 is a view showing the master disk's centrally disposed drive hub, and the way in which the drive motor of FIGS. 9–11 pin-couples to this drive hub by means of a compliant ball interface.

The master disk comprises a flexible disk and a centrally disposed drive hub (FIG. 17). This drive hub can be driven by the disk's drive motor (be it the disk drive's spindle motor, or a separate motor mounted on the alignment apparatus) in only one position of the disk and the motor. Thus, the relative positions of the data track and the position transducer track are known.

With reference to the position transducer track, this track comprises one index pulse or burst of data 22, followed by a constant-frequency clock 23, about the full 360° circle of the position track. Clock 23 may, for example, provide 1920 pulses in one revolution of the master disk.

In comparison, the master disk's head alignment data track includes 12 identical, sequential test cells of three data groups, one of which is shown in FIG. 2, about the track's 360° circumference.

Each such test cell comprises data groups 24, 25, 26, 27 and 28. All data groups may, for example, comprise the same constant frequency burst of data, such as a magnetic recording at 333 kilohertz.

Data group 24 is the tangential-alignment data group, and is centered on the track's center line 20. Data groups 25 and 26 are the radial-alignment data groups, and are offset on opposite sides of the track center line. As shown, all data groups are written with the same head; thus, the transverse width of the data groups correspond one to the other. While not critical to the present invention, it is preferred that data groups 25 and 26 do not cross center line 20.

Data groups 27 and 28 are the azimuth-alignment data groups, and are centered on center line 20. The magnetic transitions comprising these two data groups lie at equal but opposite angles to a line which is normal to center line 20.

Data groups 27 and 28 are read by the head to be adjusted, and the signal thus derived by this head is used to achieve azimuth adjustment of the head's transducing gap. The magnetic transitions of these data groups are a known angle off-normal to center line 20, and the head gap is azimuth-rotated (about FIG. 1's axis 132, which intersects center line 20 and is normal to the plane of the master disk) until the head gap produces an equal-amplitude signal from each data group. In this position, the head gap (136 of FIG. 1) is normal to center line 20.

Data groups 25 and 26 are read by the head to be adjusted, and the signal thus derived is used to achieve radial adjustment of the head gap along FIG. 1's axis 29. Only when the head gap is centered on center line 20 will the head read equal amplitude signals from data groups 25 and 26. It can be seen that this is true even when azimuth head gap error exists.

Data group 24 can be used to identify the beginning of each test cell 24–28, and thus can operate to position-locate the following data groups 25–28. Data group 24 is also the means whereby tangential alignment of the head gap is achieved.

Broken line 29 of FIG. 2 represents an exemplary position of a non-moving, fixed-position master disk radius to which the disk drive's head gap is to be aligned. The alignment data track and the position transducer track are recorded in known position relation to this radius, and also move relative this radius; see arrow 30. For example, the beginning of the first data group 24 to be encountered after index pulse 22, is a known number of clock pulses 23 after index pulse 22.

The point 31 at which radius 29 intersects center line 20 is a point in space relative to which the center of the head gap is to be aligned. The plane of FIG. 2 is in fact the plane of the master disk.

The function of the position transducer track is to provide an instantaneous, ever changing, indication of the position of each of the 12 data groups 24 relative fixed-position radius 29. By knowing when each data group 24 arrives at radius 29 (for example by counting clock 23, as initialized by index pulse 22), the head is tangent-adjusted so that its gap begins reading data group 24 at a desired time relative data group 24 arriving at radius 29, for example, at the same time. Since center line 20 is shown in FIG. 2 as a straight line, center line 20 also corresponds to the direction of head tangent adjustment.

As for pitch and roll adjustment, any or all of the data groups 24–28 can be used. However, data group 24 is preferred, and these two head adjustments are made to maximize the head signal amplitude produced by reading data group 24.

As can be appreciated, the use of multiple data groups 24–28 about the circumference of the alignment data track allows one to average the various signals and to then calculate a magnitude of head adjustment based on average position error. In this averaging technique, obviously invalid data can be disregarded, in the event a signal dropout or the like occurs. After an average error has been computed, the magnitude and sign of this error can be used to determine the magnitude and direction, respectively, of the head movement which is necessary in order to reduce a subsequent average error signal to zero. It may be desirable to approach such a zero-error head position by using more than one head adjustment step, and any head position overshoot can be corrected by the use of a resultant average error signal of opposite sign.

Exemplary movement steps are 20 microinches of linear movement and 0.1 minute of arc rotary movement.

In order for the position transducer track to accurately indicate the instantaneous position of each of the 12 data groups, relative the fixed position in space of fixed-position radius 29, this position transducer track must be very accurately located relative the master disk's alignment data track.

When pulse 22 and clock 23 are generated by a tachometer coupled to the master disk drive motor, this accuracy is provided by the tachometer's accuracy and by the accuracy of the one-position in which the motor's drive shaft can be coupled to the drive hub of the master disk.

When pulse 22 and clock 23 are generated by a tachometer track carried by the master disk itself, this accuracy is provided by very accurately writing pulse 22 and clock 23 onto the master disk. One arrangement for so writing a disk tachometer track involves using the master disk's drive motor tachometer, and a write circuit which controls a write-head. This write-head essentially duplicates the tachometer's pulse output as a disk tachometer track. In an arrangement such as this, index pulse 22 from the motor tachometer gates a write pulse to a magnetic head. This head then places an index pulse 22 on the disk's tachometer track. Thereafter, every pulse of the motor tachometer's clock 23 causes a clock pulse to be written on the disk's tachometer track. As can be appreciated, the distances between clock pulses 22, now recorded on the disk's tachometer track, are uniform and identically related to the motor tachometer's clock 23, independent of any motor speed variations which may occur during writing of the disk's tachometer track.

As used herein, the term "tangential" alignment also refers to movement of the head gap along the circumference of data track center line 20 (FIG. 2). FIG. 8 shows this track center line 20 in its true circular form, concentric about the vertical spin axis 109 (FIG. 7) of the master flexible disk 103. Reference numeral 29 is the aforementioned fixed-position disk radius. This radius intersects center line 20 at point 31. Line 130 is a line targent to center line 20 at point 31, and the aforesaid "tangential" head adjustment is produced by a bidirectional linear rotor 114 (FIG. 7, to be later described) which produces linear motion along line 130.

FIG. 8 shows an improved form of "tangential" movement. In this improved form, head holder/manipulator 119 (FIG. 13, to be later described) is supported by five-motor stock 114–118 (penetration adjustment of the head being accomplished by relative movement of disk drive 102 and disk 103, as will be described). Tangential motor 114 (FIG. 7) is the bottom motor of this stack, and it is mounted to the base plate of fixture 100 by means of a plate 131 (FIG. 8) which pivots about spin axis 109, in a plane which is parallel to disk 103. Linear motor 114 is connected to produce this movement of plate 131, and since the head is supported substantially coincident with point 31, by its holder/manipulator 119, this linear movement produces movement of the head along center line 20, rather than along tangent line 130.

Both of these means of achieving tangential alignment are embodied within the present invention's use of the term "tangential."

Figure 3:
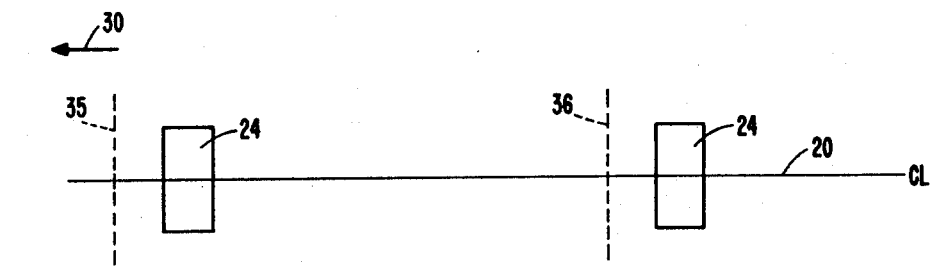
FIG. 3 is another view of the master disk's alignment data track, and shows how each group of data patterns is broken up into ten sectors, for example.
Figure 4:
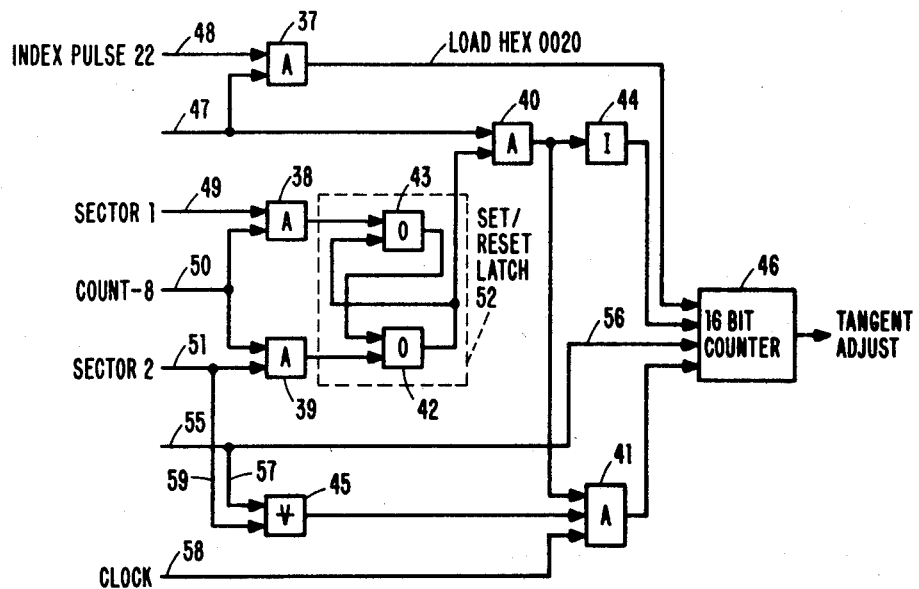
FIG. 4 shows a circuit for accomplishing the aforesaid tangential head adjustment in accordance with the present invention.

FIGS. 3 and 4 show a portion of the master disk's alignment data track, and one circuit, respectively, for accomplishing tangential head gap alignment. For purposes of definition and explanation only, spaced dotted lines 35 and 36 are shown as dividing the alignment data track into a test cell which contains FIG. 2's data group 24–28 format. Twelve of these test cells comprise the 360° alignment data track. Each test cell is conceptually divided into 10 equal-size sectors, defined as sectors 1–10, as shown. Data group 24 which is used for tangential head alignment exists in sector 2 of each test cell.

The positions of dotted lines 35 and 36, as well as the boundary locations between sectors 1–10, are determined by a position-counter which is initialized upon detection of FIG. 2's index pulse 22, and which thereafter counts the 1920 pulses of clock 23 which occur during one revolution of the master disk. In this manner, these boundaries are accurately determined relative alignment data group 24–28. Decoding of this advancing position-counter provides the 12 test cells, comprising 10 sectors per test cell, comprising 16 clock pulses of clock 23 (FIG. 2) per sector. For purposes of definition, the mid position of each sector will be called count-8 and count-16 defines the boundary between sectors.

FIG. 4 is a discrete-logic circuit which calculates the magnitude and direction of the tangential alignment step necessary to produce a desired relationship, for example coincidence, between the head gap and the aforedefined fixed-position disk radius 29. In this figure, 37–41 are AND gates; OR's 42 and 43 comprise a set/reset latch 52; 44 is an inverter circuit; 45 is an exclusive-OR circuit; and 46 is a 16-bit up/down counter.

The input conductors to this circuit comprise a tangential-alignment-enable line 47 which is active during the time that the aforesaid position-counter indicates that the fixed-position radius is within sector 1 or 2 of a test cell.

Conductor 48 is activated by the occurrence of FIG. 2's index pulse 22, thereby indicating to the circuit of FIG. 4 that a one-disk-revolution tangential alignment procedure is about to begin. Coincidence of active conductors 47 and 48 enables AND 37, and the output thereof loads a hexadecimal value "0020" into 16-bit counter 46.

Conductors 49–51, AND's 38 and 39, and set/reset latch 52 define an alignment data track sector window during which the circuit of FIG. 4 is operative.

Signals 49–51 are provided by decoding the state of the above-mentioned position counter. So long as this count indicates that the fixed-position radius is in sector 1, conductor 49 is active; when this radius is in sector 2, conductor 51 is active; and the occurrence of the middle of each of sectors 1 and 2 produces an active pulse on conductor 50. AND 38 is first enabled at the middle of sector 1 (FIG. 3), thus setting latch 52. AND 40 is now enabled, and its output enables counter 46 by way of inverter 44, as well as providing one enabling input to AND 41.

It will be remembered that the head gap whose tangential position should, for example, coincide with the sector 1-sector 2 boundary (i.e. the beginning of data group 24) does not so coincide prior to tangential alignment. Due to the coarse accuracy of the head alignment apparatus, the head gap will, however, be somewhere in the distance spanned by sector 1 and sector 2.

Assume that the head being adjusted is positioned too far to the right relative data group 24 of FIG. 3. In this case, data block 24 will be read by the head while the position counter is indicating sector 1 of FIG. 3; i.e., the head was encountered during movement 30 prior to the time it should have been encountered. The detection of data group 24 by the head activates conductor 55. As a result, conductor 56 enables counter 46 to count down, and conductor 57 enables exclusive-OR 45 to condition AND 41 so that clock pulse conductor 58 begins decrementing counter 46. Conductor 58 is connected to the output of a constant-frequency electronic clock, not shown.

The next event to occur, under the assumed condition of head tangent position error, is that sector 2 signal 51 becomes active at the boundary between sector 1 and sector 2. Conductor 59 now becomes active and AND 41 is inhibited. In addition, latch 52 is reset, causing AND 40 and inverter 44 to disable counter 46.

The count now in counter 46 is a measure of the extent of leftward movement of the head (i.e. in the direction 30 of FIG. 3) which is necessary to bring the head gap to the position of the fixed-position disk radius.

In actual practice, the above procedure is repeated 10 times, one for each test cell. As a result, counter 46 cummulatively decrements 10 times, and the average single decrement is used to produce the needed tangential movement of the head gap.

It will be understood that when the head gap is initially too far to the left, the head detects data group 24 somewhere in sector 2, but not at the sector 1-sector 2 boundary. In this condition, sector 2 conductor becomes active before data group 24 (FIG. 3) is detected. Exclusive-OR 45 enables AND 41 and counter 46 begins counting. However, conductor 55 is not active until the head encounters data group 24. With conductor 56 inactive, counter 46 counts up.

Later, when data group 24 is encountered by the head being aligned, conductor 55 becomes active. Exclusive-OR 45 is disabled, AND 41 is likewise disabled, and incrementing of counter 46 stops.

The extent to which counter 46 has been advanced is a measure of the distance that the head must be moved to the right in order to place the head at the boundary of sectors 1 and 2 (FIG. 3), as these locations are defined by decoding position clock track 23 (FIG. 2).

When the head gap is properly positioned, conductors 51 and 55 become active simultaneously, and exclusive-OR 45 does not enable AND 41, in which case counter 46 neither increments nor decrements.

FIG. 3 has been used to explain how data group 24 is used to achieve tangential adjustment of the head gap. It is helpful to also relate the 10 sectors shown in this figure to the remaining portion of FIG. 2's data groups. More specifically, data group 25 occupies the entirety of sector 4; whereas, data group 26 occupies all of sector 5. In like manner, data groups 27 and 28 occupy sectors 7 and 8, respectively. No data exists in sectors 1, 3, 6, 9 and 10.

In order to achieve radial adjustment of the head which is undergoing adjustment, FIG. 2's data groups 25 and 26 are read by the head. As can be appreciated, when the head gap is not centered on center line 20 of the master disk's alignment data track, the head output signal from one of data groups 25 or 26 will be of a greater amplitude.

Once tangential alignment of the head gap has been achieved, the instantaneous position of the head gap is known to coincide with the various FIG. 3 sector boundaries, as these boundaries arrive at the location of the tangent-adjusted head gap.

Figure 5:
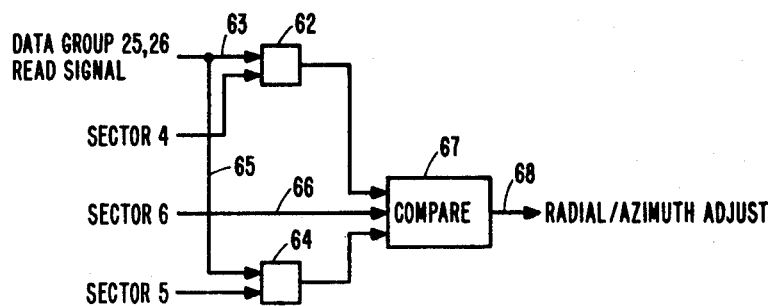
FIG. 5 shows a circuit for accomplishing the aforesaid radial head adjustment, and/or azimuth head adjustment, in accordance with the present invention.

By decoding the position counter which is being advanced by clock 23, the arrival of the boundaries of data block 25, 26, sectors 4, 5, can be identified. As shown in FIG. 5, the arrival of the leading boundary of sector 4 at radius 29 enables an amplitude sensitive read circuit 62 such that the amplitude of the head's read signal 63 for data group 25 can be sampled and held by circuit 62. Likewise, the arrival of data group 26 at radius 29 enables a similar circuit 64 such that the amplitude of the head's read signal 65 for data group 26 can be sampled and held.

Conductor 66 enables compare circuit 67 during sector 6, and circuit 67 develops output signal 68 whose amplitude is indicative of the magnitude of radial head movement necessary to produce equal outputs from circuits 62 and 64, and whose sign is indicative of the direction in which the movement should occur; i.e., either inward toward the center of the master disk, or outward toward the disk's outer circumference.

FIG. 5 also can be used to achieve azimuth adjustment of the head. In so doing circuits 62 and 64 are enabled during sectors 7 and 8, respectively, and output 68 of circuit 67 now comprises a signal whose amp iude is indicative of the amount of azimuth rotation necessary to achieve equal read signal outputs 63 and 65 from data groups 27 and 28, respectively; whereas the sign of output signal 68 is indicative of the direction in which this rotary head adjustment step should be taken.

In actual practice, it is not necessary to make a tangent adjustment prior to other adjustments. As stated above, initial adjustment of the head's tangent position is convenient because this adjustment thereafter makes the position of the head gap a known parameter relative the sector boundaries.

However, note that the track width of radial ad ment data groups 25 and 26 is wider than the track width of data groups 24, 27 and 28—specifically, twice as wide.

Since the head holder/manipulator quite accurately coarse-positions the head radially with respect to the center line 20 of the master disk's data track 22, it is also possible to adjust the head's radial position as the initial adjustment. In this case, the initial open-loop, mechanical positioning of the head is assumed to initially position the head in the location of sector 3 through sector 6, as these sectors pass radius 29. Each sector is an exemplary 0.0075 inch wide, and the construction of the apparatus to achieve initial positioning of the head somewhere in the 4 sector, 0.03 inch long area, is easily achieved.

In this alternative approach, FIG. 5's circuit is used to achieve radial adjustment of the head, to center its gap on center line 20.

This initial adjustment can be followed by the use of FIG. 5 to achieve azimuth adjustment, as aforesaid—followed by tangent adjustment as aforesaid.

Pitch and roll adjustment of the head also utilize data format 24–28. However, the sector information provided by position clock 23 need not be used. Pitch and roll adjustment of the head's disk penetration, radial, azimuth and tangential adjustments have been made. Pitch and roll adjustments are both made by a sequential iterative process of moving the head in a pitch and a roll attitude in order to locate the head gap in a zone of maximum signal strength produced by reading data format 24–28. The pitch/roll sequence of adjustment is not critical. Since pitch and roll adjustment require only an amplitude sensitive circuit, a circuit such as FIG. 5 can be used, where sample and hold circuits 62 and 64 are used to compare signal amplitude for various head positions, as pitch and roll are adjusted in an iterative fashion, to find the position of high or highest signal amplitude. More specifically, the head is ideally positioned to the center of what is usually a relatively flat amplitude range—as amplitude is plotted as a function of head position.

Figure 6:
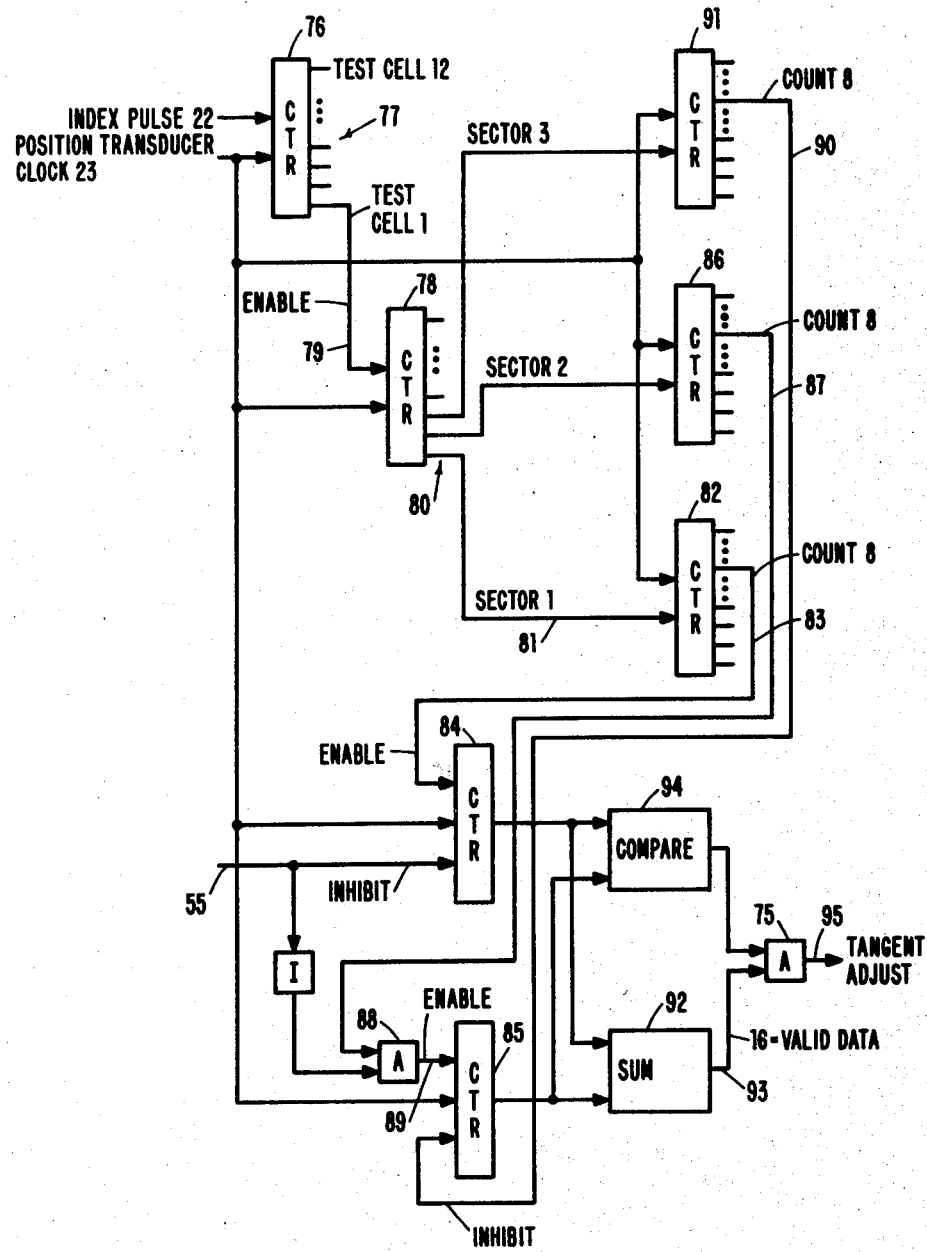
FIG. 6 shows another circuit for accomplishing the aforesaid tangential head adjustment in accordance with the present invention.

FIG. 6 shows another exemplary circuit for generating a tangent adjustment output signal 95 from AND gate 75. This circuit operates to (1) count the number of pulses of clock 23 which occur from the time the middle of sector 1 arrives at radius 29 (FIG. 3) until the head being aligned detects the beginning of data block 24, (2) count the number of pulses of clock 23 which occurs from the time the end of data block 24 is detected by the head, to the arrival of the middle of sector 3 at radius 29, (3) add these two counts to insure that they equal "16", and (4) upon detecting the proper sum, i.e., valid data, compare the two counts in order to generate tangent adjust output signal 95.

Like the circuit of FIG. 4, the FIG. 6 circuit is operative during a given sector window. The window of FIG. 6 exists from the middle of sector 1 to the middle of sector 3. This is the equivalent of two sector lengths—or thirty-two pulses of clock 23.

Two things are known. Namely, the head will detect the beginning and end of data group 24 somewhere in this two-sector area, and data group 24 is of a length equal to sixteen pulses of clock 23. The circuit of FIG. 6 locates the tangential position of the head gap by determining just where in this two-sector area the head gap first detects the presence of data group 24, and later first detects the absence of data group 24. This circuit has the intelligence for knowing that the absence of signal should exist for sixteen clock 23 pulses. If this condition is not detected, or if the error is too great, the circuit does not use the results when making an average tangential position error calculation for the multiple test cells about the 360° circumference of the master disk's adjustment data track.

With specific reference to FIG. 6, this figure shows a counter 76 whereby FIG. 2's clock track 23 is decoded in order to define the twelve test cells about the 360° circumference of the alignment data track, one test cell of which is shown as containing data group 24–28. When index pulse 22 is detected, counter 76 is initialized. Thereafter, counter 76 counts the pulses of clock 23. The twelve counter outputs 77 define the presence of each individual test cell at fixed-position radius 29.

Counter 78 is associated with test cell 1, and conductor 79 enables counter 28 as test cell 1 passes radius 29. Counter 78 is operable during this time to count the pulses of clock 23, and the counter's ten outputs 80 provide a fine-position indication of the presence of radius 29 within test cell 1; i.e., an indication that one of the ten sectors of the test cell is at the radius (see FIG. 3).

When radius 29 is in sector 1, conductor 81 is active, and counter 82 is thus enabled to count the sixteen pulses of clock 23 which occur as sector 1 traverses fixed-position radius 29. Counter output conductor 83 is active at count-8, and signals the fact that the center of sector 1 is at radius 29.

Counter 84 is enabled by count-8 conductor 83, and counter 84 now begins counting clock 23.

The next event to occur is variable, and occurs when the head to be aligned encounters the leading bit of data group 24; i.e., encounters the boundary of sector 1 and sector 2. If this occurs at the same time that radius 29 encounters this boundary, counter 84 will contain count-8, and the head tangential position is correct. However, assuming tangential error exists, conductor 55 becomes active when the leading bit of data group 24 is read by the head, and counter 84 is thus inhibited from further counting. Counter 84 now contains a count which is either less than count-8, or greater than count-8, since tangential head position error has been assumed. When the head is positioned to the left of radius 29 (FIG. 2), the head encounters data group 24 too early relative clock 23, and the count is less than count-8. When the head is positioned to the right, of radius 29, data group 24 is encountered too late, and the count is greater than count-8.

The occurrence of the last bit of data group 24, at the location of the head gap, enables counter 85; however, this is not allowed to occur until the center of sector 2, i.e., the center of data group 24, has arrived at radius 29. More specifically, counter 86 is enabled to begin counting the pulses of clock 23 when the border of sectors 1 and 2 arrives at radius 29. Eight pulses of clock 23 later, conductor 87 becomes active, and AND 88 is partially enabled. Thereafter, when the read signal indicates the absence of data group 24 at the head gap, conductor 89 enables counter 85 to begin counting the pulses of clock 23. Counter 91 is enabled when the leading edge of sector 3 reaches radius 29. At the middle of sector 3, i.e., count-8 of counter 91, counter 85 stops counting due to an active conductor 90.

Again, if the head gap is properly tangent-positioned at radius 29, the arrival of the beginning of sector 3 at radius 29 will coincide with conductor 89 enabling counter 85, and counter 85 will count the first eight pulses of clock 23 which will be generated as the first half of sector 3 passes radius 29. When the head gap is positioned to the left of radius 29 (FIG. 2), the head senses the last bit of data group 24 too early relative clock 23 and the count in counter 85 is greater than count-8 at the time that the center of sector 3 reaches radius 29. Conversely, when the head gap position is tangentially in error to the right of radius 29, the absence of data group 24 is signaled too late, and the count in counter 85 is less than count-8 when the arrival of the middle of sector 3 at radius 29 inhibits further counting by counter 85.

In all cases, the sum of the two counts now present in counters 84 and 85 should be "16". Circuit 92 checks this sum, and activates conductor 93 if valid data has been generated by reading data group 24.

The extent of tangential error in head position is determined by the difference in the two counts now found in counters 84 and 85, and the sense of this error is determined by which counter has the higher count. Circuit 94 passes this information to output conductor 95 as a tangent adjustment output signal which is then used to effect the needed distance and direction of head gap movement in order to subsequently cause both counters to contain count-8.

As previously mentioned, a tangent error signal 95 is derived for each of the twelve test cells that provide valid data, and these signals are preferably averaged in order to determine a final error signal. In addition, it will be appreciated that the circuit of FIG. 6 is initialized prior to use, as aforesaid, with each of the twelve test cells.

In FIG. 6, the various counters which occupy the upper portion of the logic circuit provide information as to the location of index pulse 22 relative fixed-position radius 29, as this position constantly changes, and as this position is determined by counting position transducer clock 23. This position information can also be used to define the various sector positions (see FIG. 3) which are called for in FIGS. 4 and 5.

Figure 7:
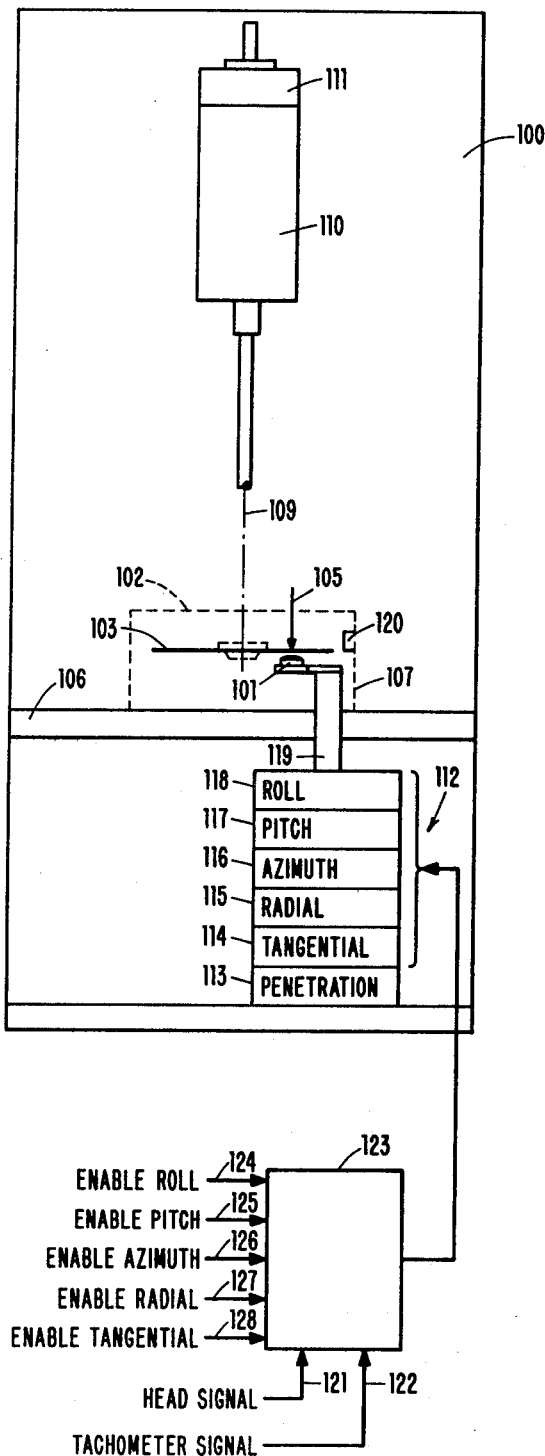
FIG. 7 is a showing of one apparatus, and its stacked array of six rotary and linear motors supporting the aforesaid head manipulator/holder.
Figure 8:
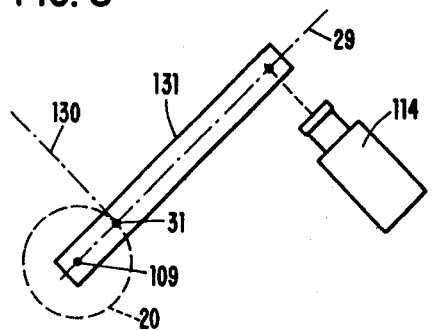
FIG. 8 is used to explain another means of accomplishing tangential head alignment.

FIG. 7 is a showing of a first alignment apparatus which is used to operatively position head 101 of a flexible disk drive 102 shown in dotted line outline. A master disk 103, as previously described, is shown mounted on the disk drive's spindle (not shown). This master disk carries the described alignment data track at disk track location 22, identified by arrow 105. The disk drive includes a movable head carriage (not shown) to which head 101 will be clamped once the head is properly positioned. This head carriage is positioned to its track-22 position during head adjustment. As can be appreciated, the size relationship of head 101 has been exaggerated to facilitate explanation.

Apparatus 100 includes a table 106. This table includes a right-positioning datum surface 107 and a rear-positioning datum surface (not shown). These two datum surfaces define a right angle into which one corner of the square-outer-housing disk drive 102 is manually located. When drive 102 is so located, head 101 is generally aligned with the disk's datum track, and the spin axis 109 of the drive's spindle coincides with the rotational output axis 109 of motor 110.

Motor 110 is mounted at a fixed position on apparatus 100, and includes a tachometer 111 whose output is that described relative pulse 22 and clock 23 of FIG. 2. As mentioned, this tachometer output can alternatively be provided by a track carried by master disk 103.

Reference numeral 112 designates a six-motor serial array or stack of motors.

Motor 113 is energized to lift motors 114–118, and head holder/manipulator 119, vertically upward. This causes head 101 to penetrate the spin-plane of flexible disk 103, as this disk is spun by motor 110. This head-penetration-movement can, for example, be completed when the top surface of holder/manipulator 119 engages the disk drive's datum surface 120.

Thereafter, the head's output signal 121 and the aforementioned tachometer signal 122 are provided as input signals to control means 123. Signals 124, 125, 126, 127, 128 operate, one at a time, to enable control of motors 118, 117, 116, 115, 114, respectively, and head 101, i.e. its read/write gap, is adjusted as aforesaid.

It is to be understood that control means 123 may take many forms, as will be appreciated by those skilled in the art. An example of a manual means is an oscilloscope whose visual output enables manual energization of motors 114–118 to move head 101 until a desired visual output occurs. An example of an automatic means is a programmed computer whose output controls motors 114–118. A combined manual/automatic means might, for example, provide an oscilloscope to ensure that the head is initially positioned within the control range of a programmed computer, and only after manual control of motors 114–118 properly course-positions the head, is control of the motors turned over to the computer for final fine-position control.

After the head is properly positioned, it is clamped in operative relation to the disk drive's movable head carriage, not shown.

The details of an apparatus 100 will now be described relative a second embodiment.

Figure 9:
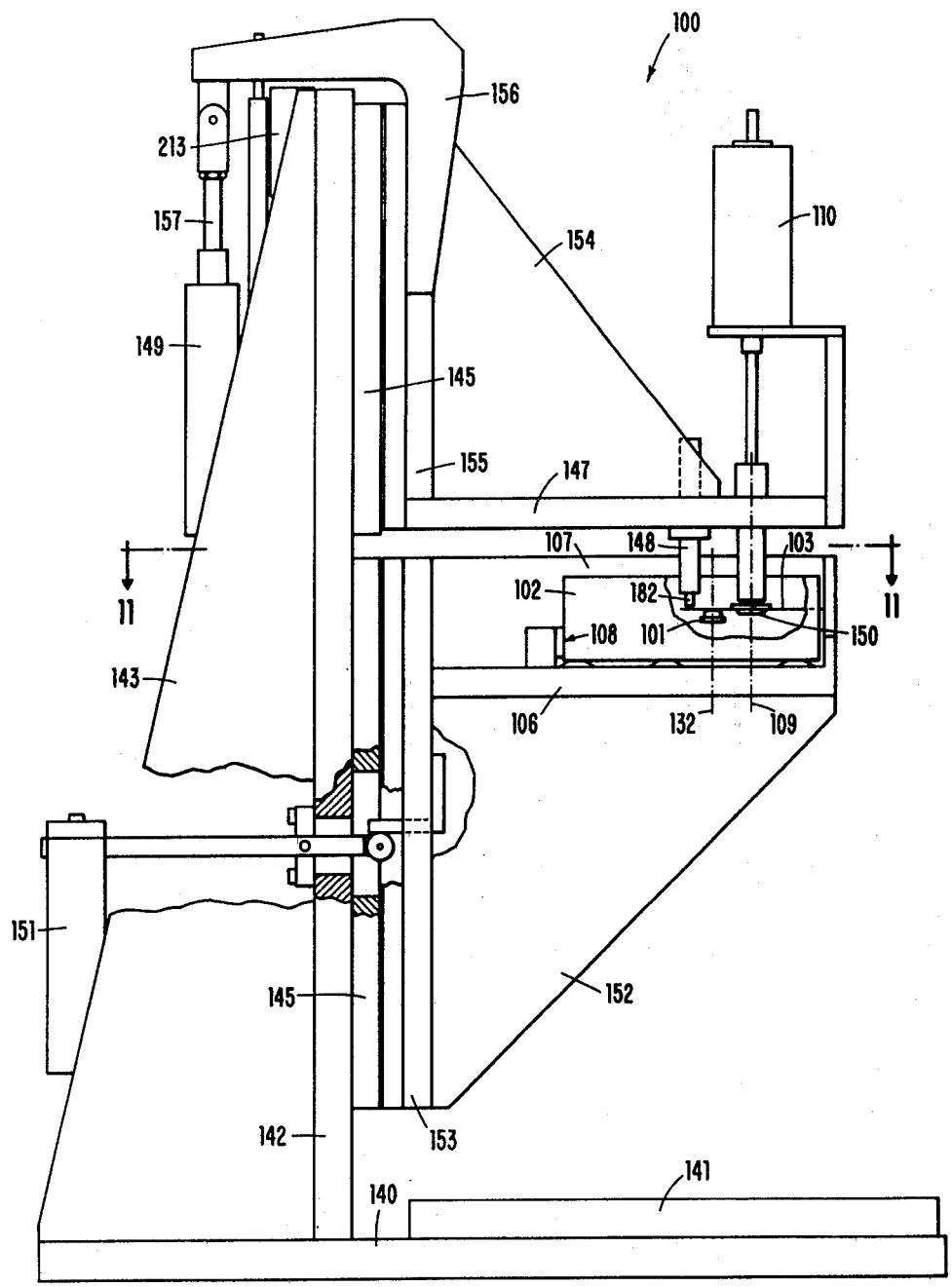
FIG. 9 is a side view of a second alignment apparatus, and its stacked array of five rotary and linear motors supporting the aforesaid head holder/manipulator, the penetration motor being provided to move the disk drive, rather than the head as in FIG. 7. For simplicity the five-motor stack is not shown in FIG. 9.

FIG. 9 is a side view of such an apparatus, having a base plate 140 upon which is placed a support plate 141 for a five-motor stack or array of motors (FIG. 10) similar to motors 114–118 of FIG. 7. In order to simplify the view of FIG. 9, this motor array is not shown.

Figure 11:
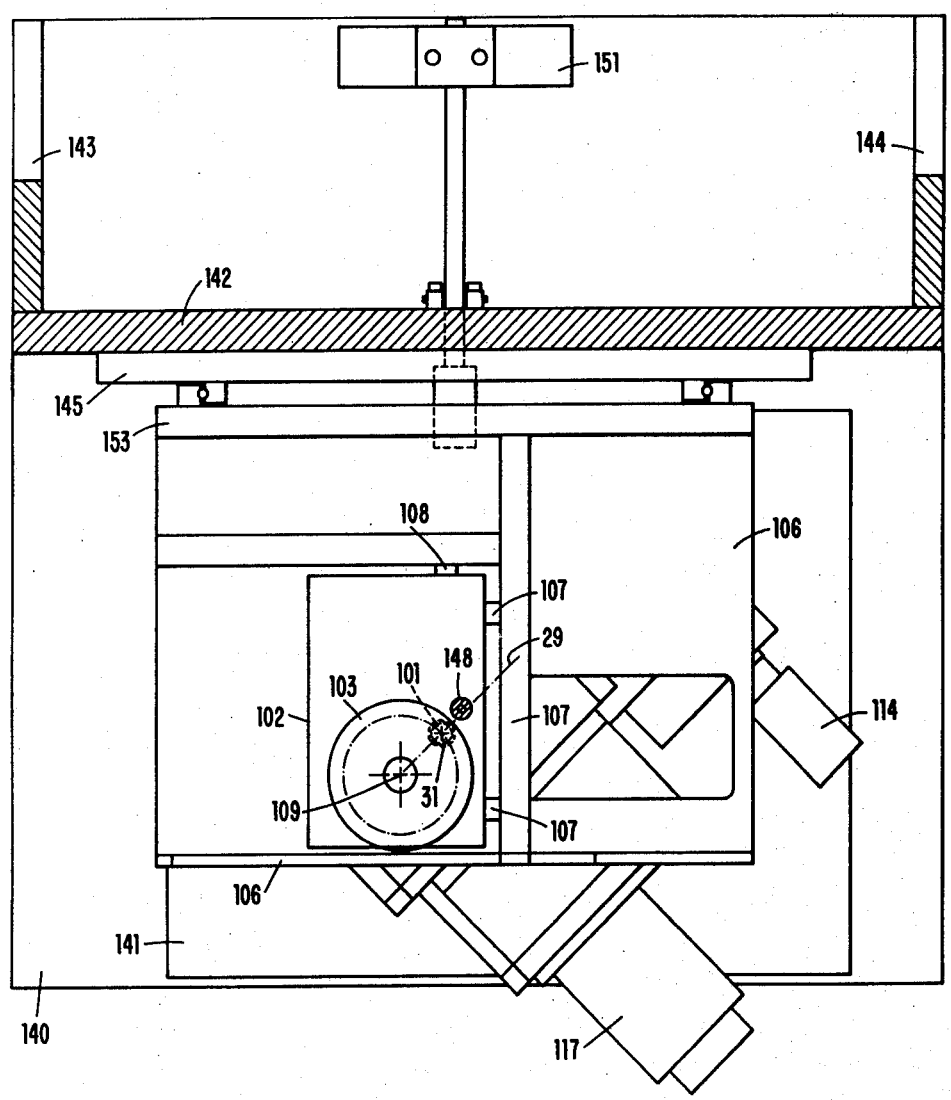
FIG. 11 is a top view of the FIG. 9 apparatus.

Base plate 140 mounts a support panel 142 which is held vertically upright by a pair of braces 143, 144 (also see FIG. 11). Support panel 142 mounts two pairs of stationary slide blocks 145 and 146. These slide blocks movably support a first, lower disposed, horizontal table 106 upon which the disk drive 102 to be adjusted is placed. An upper-disposed support table 147 holds the master alignment disk's spin motor 110. A positioned transducer 148, which operates to sense the relative vertical position of table 106 and head 101, is mounted on plate 140. Transducer 148 determines the distance by which head 101 penetrates the spin-plane of flexible master disk 103, as table 106 moves vertically, as will be described.

Table 106 is supported by a pair of support brackets 152 which attach to a mounting plate 153 such that the assembly 106, 152, 153 is vertically movable on lower slide blocks 145, 146.

Table 147 is similarly supported by a pair of side-disposed brackets 154 which attach to plate 155. Plate 155 includes a pair of extending arms 156 which connect to the output member 157 of air cylinder 149. Plate 155 is vertically movable on upper slide blocks 145, 146.

Figure 10:
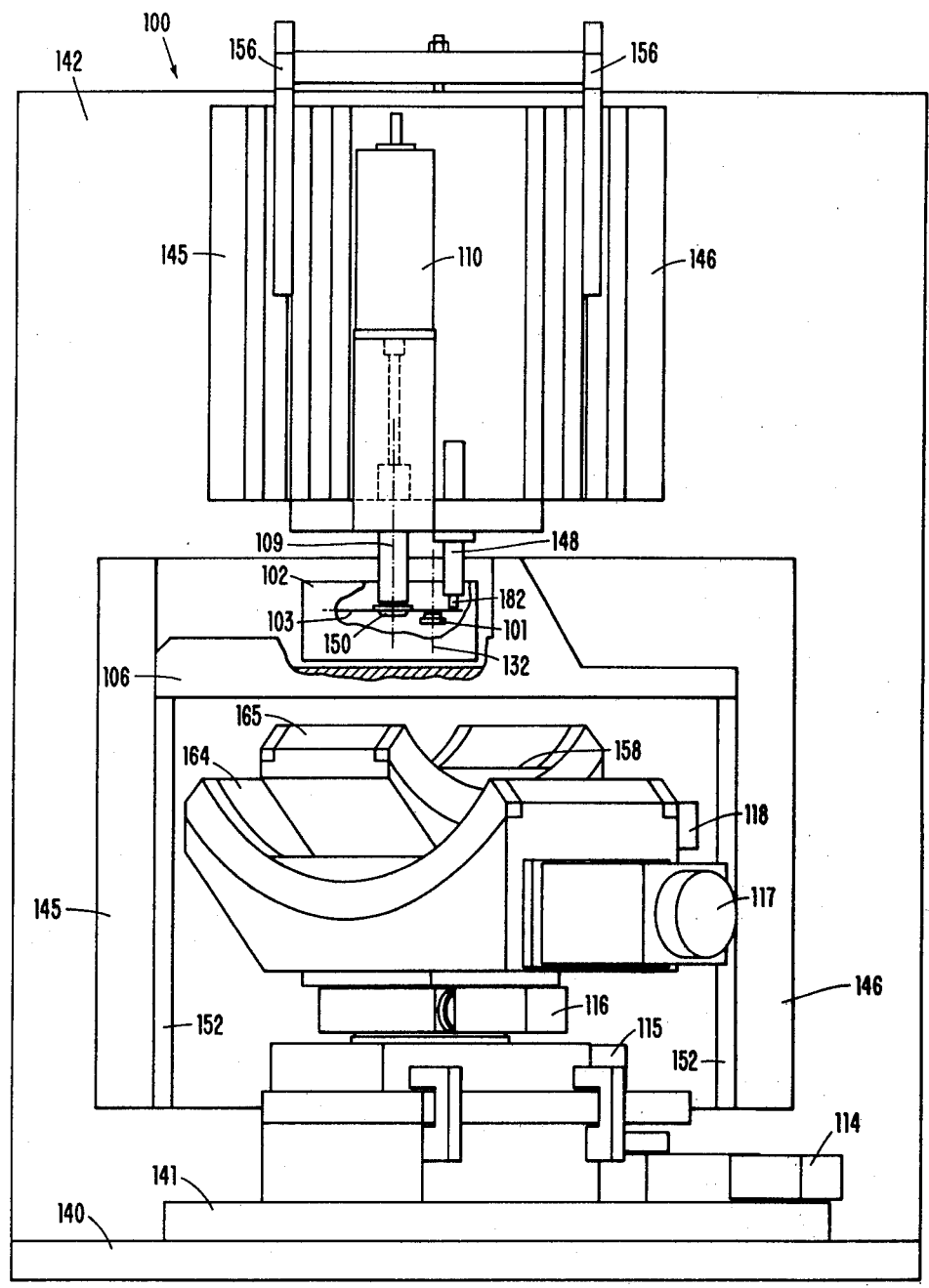
FIG. 10 is a front view of the FIG. 9 apparatus, showing the five-motor stack.

The apparatus of FIGS. 9 and 10 is shown with the position of tables 106 and 147 such that proper head penetration is achieved. Prior to this time, air cylinder 149 is energized to raise table 147. When this table moves upward, the motor's drive shaft 150 (FIG. 17) is raised up off the disk. Table 106 is biased in an upward direction by weight 151. However, table 106 can move but a short distance upward, whereupon a stop (not shown) is encountered. The extent of upward movement of table 147, as determined by air cylinder 149, is much greater, and this separation of tables 106 and 147 allows the operator to remove an adjusted disk drive 102 and replace it with another drive whose head then undergoes adjust- ment.

FIG. 11, a top view of FIGS. 9 and 10, shows such a disk drive registered in position such that its rear, right-hand corner is properly registered against locating stops 107 and 108. These stops are carried by table 106. When the disk drive is properly positioned, in this manner, the spin axis of motor 110 (i.e., axis 109 in the various views) corresponds to the spin axis of the disk drive's spindle.

FIG. 10 is a front view of this apparatus, and shows the five-motor stacked array. Tangential motor 114 is a linear motor, whereas azimuth motor 116, pitch motor 117 and roll motor 118 are rotary motors. In order to simplify the view, FIG. 10 does not show the radial motor, or the aforementioned head holder/manipulator. This manipulator is mounted on the movable output member 158 of the top-disposed roll motor 118.

FIG. 11 shows head 101 disposed beneath the center line 20 of master alignment disk 103's alignment data track, and shows disk drive motor 110's and the disk's common spin axis 109. In this view, pitch motor 117 and tangential motor 114 are also visible, the other motors being obscured by table 106.

Figure 12:
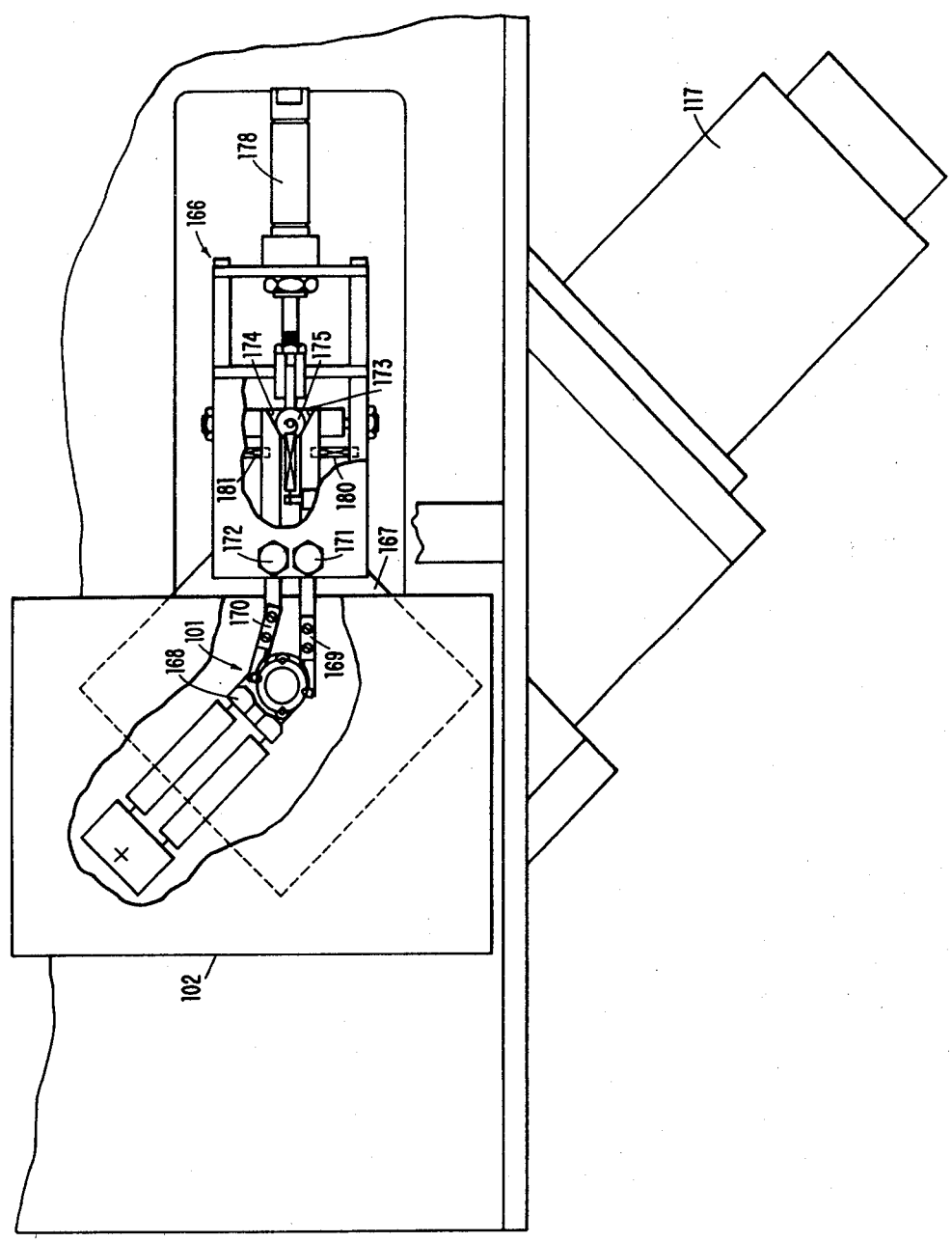
FIG. 12 is a top view, like FIG. 11, showing the head holder/manipulator.
Figure 13:
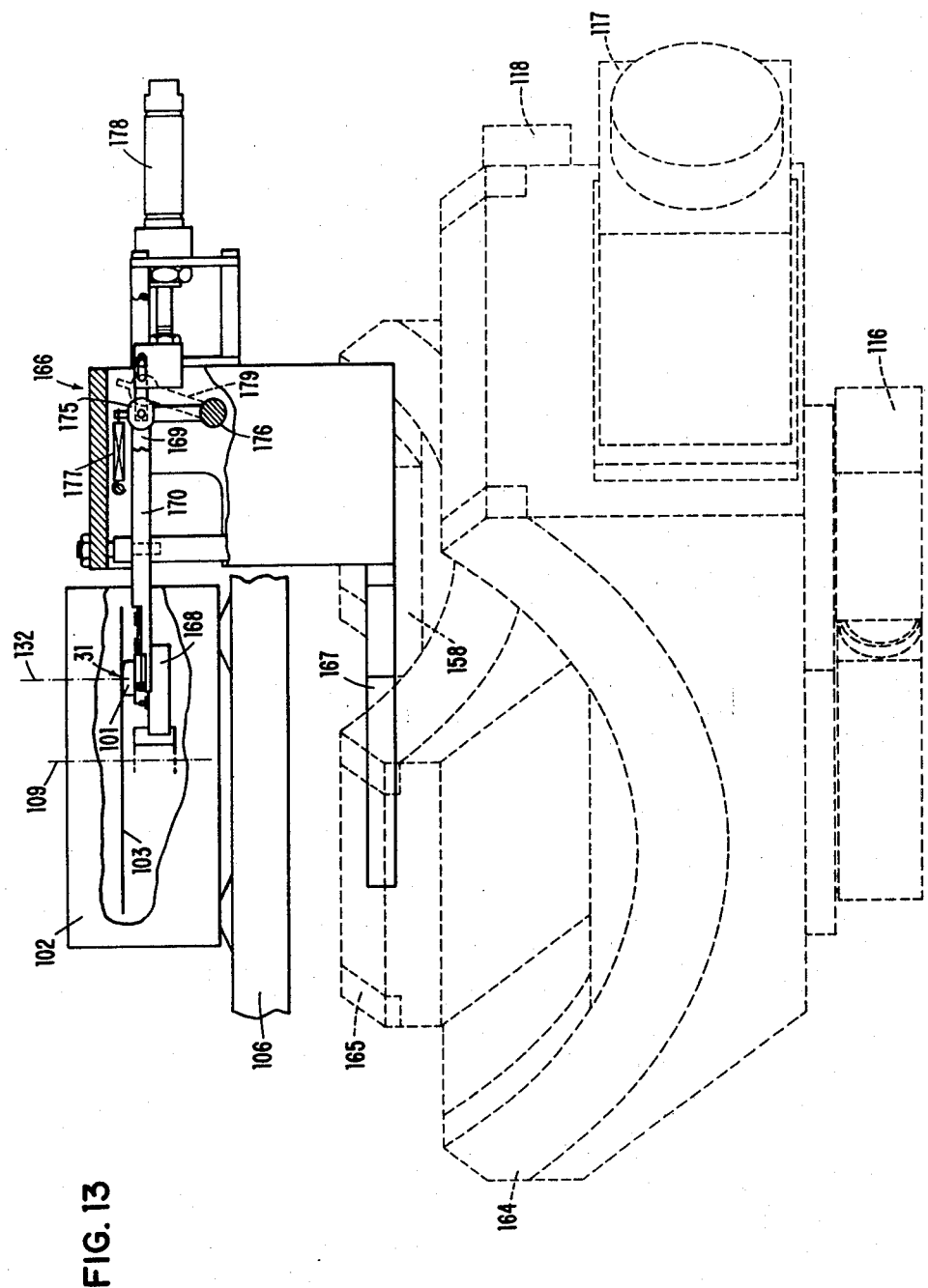
FIG. 13 is a front view, like FIG. 9, showing the head holder/manipulator, and showing the top three motors of the five-motor stack in dotted lines.
Figure 14:
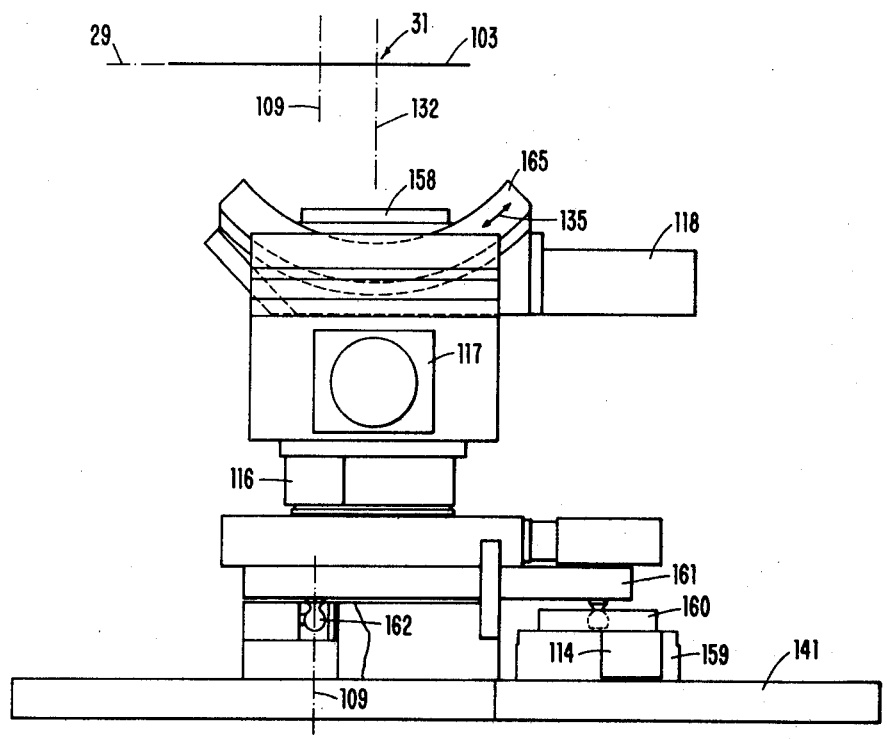
FIG. 14 is a side view of the five-motor stack per se, as seen in the plane of FIG. 1's roll movement and radial movement.

FIG. 14 shows details of the five-motor stacked array 114–118, including a top-disposed mounting plate 158 to which the aforementioned head holder/manipulator of FIGS. 12 and 13 is mounted. Also shown in this figure is the plane of disk 103, which plane is perpendicular to the plane of the figure. The plane of FIG. 14 includes fixed position disk radius 29 and penetration axis 132, as well as roll movement 135 (also see FIG. 1).

Tangential motor 114 comprises a housing 159 and a movable output member 160. Output member 160 is connected to plate 161. Plate 161 carries the four upper motors 115–118.

In a similar fashion, the movable output member of each of the motors 115–118 carries the housing of its next higher disposed motor, and in this manner carries all of the higher disposed motors as well as the head holder/manipulator.

The tangential motion achieved by tangential motor 114 is of the aforementioned type discussed relative the embodiment of FIG. 8. Namely, plate 116 is pivoted at 162, such that plate 161 (which is perpendicular to disk spin axis 109) rotates about disk spin axis 109.

Figure 16:
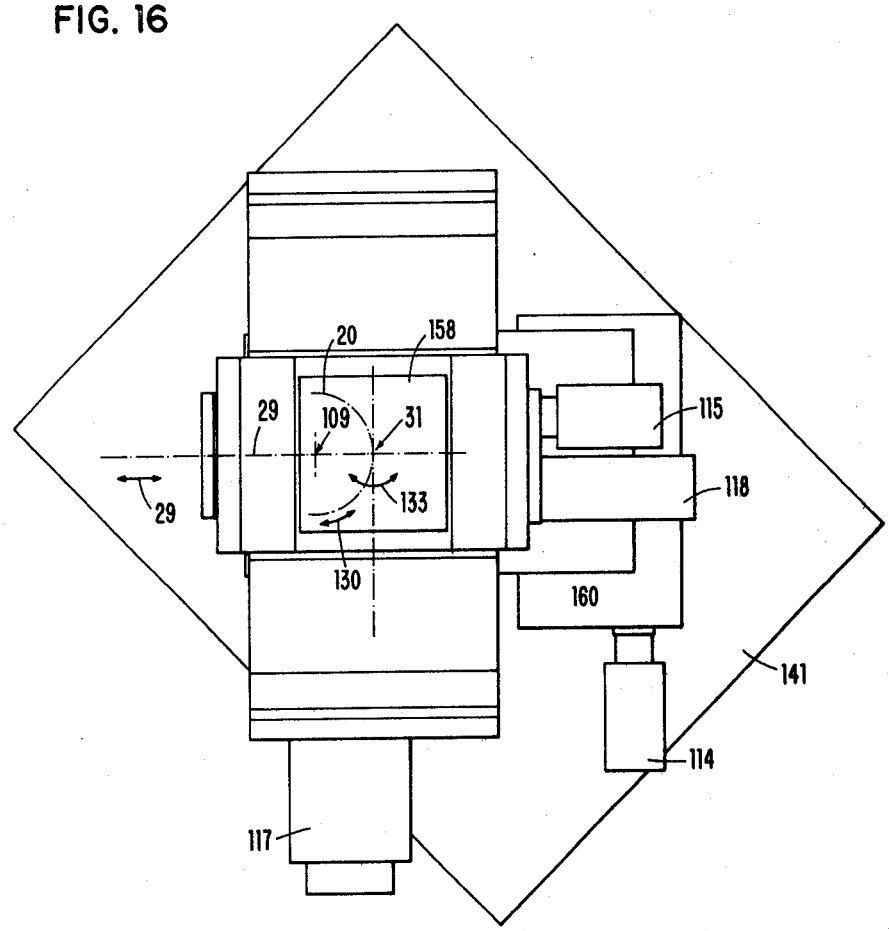
FIG. 16 is a top view of the motor stack of FIG. 14, 15.

With reference to FIG. 16, it can be seen that this rotation of plate 160 about spin axis 109, causes the head gap (which is located at about point 31 by the head holder/manipulator) to move along the track center line 20 in accordance with tangential movement arc 130.

Figure 15:
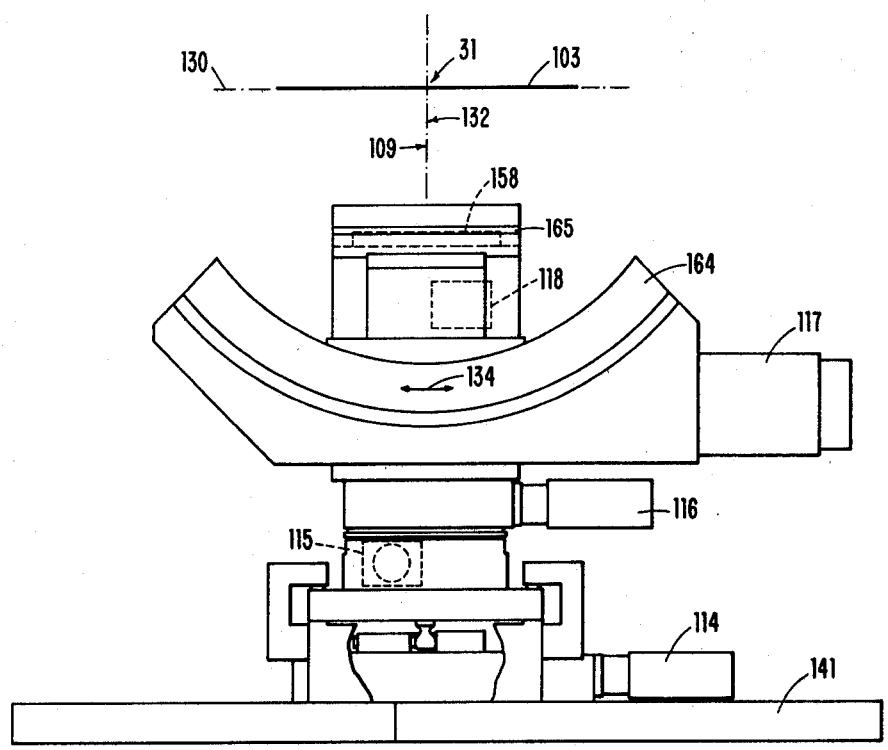
FIG. 15 is a side view, rotated 90° from FIG. 14, as seen in the plane of FIG. 1's pitch movement and tangential movement.

Radial motor 115 is shown in its relative vertically stacked position in both FIGS. 14 and 15. In FIG. 16, the top view, it is seen how the movable output member of this motor 115 moves motors 116–118 along radius 29 in accordance with the double-arrow radial movement vector labeled 29.

The next higher disposed motor is azimuth motor 116. This motor produces rotation about penetration axis 132, in a plane which is perpendicular to axis 132. This movement vector is shown in top view FIG. 16 as azimuth movement vector 133, and this corresponds to the azimuth vector 133 shown in FIG. 1.

Pitch motor 117 and roll motor 118 (the two top disposed motors of the five-motor stack) include rotary output slides 164 (FIG. 15) and 165 (FIG. 14), respectively. The center of rotation of both of these output slides includes point 31 (also see FIG. 1). As seen in FIG. 15, rotary output slide 164 of pitch motor 117 carries both the housing and output member of motor 118. Output member 165 of roll motor 118 carries the output of the five-motor stacked array, i.e., plate 158 (see FIGS. 14 and 15).

As mentioned previously, the head's pitch adjustment 134 and roll adjustment 135 (motors 117 and 118, respectively) are achieved by maximizing the head's output signal, as this signal is derived from reading FIG. 2's alignment data track on master disk 103. It has been found that a plot of signal strength as a function of the head's pitch or roll adjustment usually shows a relatively broad, flat maximum-signal response. As a result, an exemplary way to adjust both pitch and roll is to adjust the head a given number of motor steps, in both directions, off the nominal center position at which motors 118 and 117 and head 101 are maintained during the prior tangent, radial and azimuth adjustment. If the signal strength is flat for all three of these head positions (nominal, and a given number of motor steps off-nominal, in both directions), the head is positioned to nominal. If, however, a reduction in signal strength is found in one direction off-nominal, the head is positioned, for example, at the other position off-nominal. If both off-nominal positions show a reduction in signal strength, the head is of course positioned at nominal.

Here again, the signal strength referred to may be the average signal strength derived from all of FIG. 2's data patterns 24–28 for one or more revolutions of the master disk.

The view of FIG. 13 shows the aforementioned pitch and roll output members 164 and 165 in dotted line, and shows head holder/manipulator 166 and its horizontally disposed mounting plate 167 bolted to plate 158, i.e., to the output of the five-motor stacked array.

FIG. 13 also shows head 101 loosely disposed relative the disk drive's head carriage 168 (also see FIG. 19) as output arms 169, 170 of the head holder/manipulator support the head gap in the general vicinity of point 31 (see FIG. 1), and in proper penetration to the flexible master disk 103 which now engages to the drive spindle (not shown) of the flexible disk drive 102 which is undergoing head adjustment.

The top view of FIG. 12 shows the drive's head carriage 168. The construction and arrangement of such a head carriage is disclosed in copending and commonly assigned patent application Ser. No. 340,170 filed Jan. 18, 1982, incorporated herein by reference. FIG. 12 also shows the manipulator's pair of movable arms 169, 170 which pivot about vertical axes 171 and 172, respectively. The other end of these arms includes a beveled surface 173, 174 which cooperates with a control ball 175.

As seen in FIG. 13, ball 175 pivots at 176 and is biased to a generally upright, vertical position, by spring 177. Linear motor 178, when energized, pulls ball 175 to its dotted line position 179 (FIG. 13). In this position, a pair of springs 180, 181 (FIG. 12) operate to move the beveled ends of arms 169, 170 together. In this position, the left-hand end of arms 169, 170 (as viewed in FIG. 12) are separated to either release a head 101 which has been clamped to carriage 168, at the end of an alignment procedure, or, alternatively, to accept a head 101 which is loosely positioned on carriage 168 of a disk drive 102 which has just been inserted into its proper position on table 106, prior to undergoing head alignment.

If the latter is true, de-energization of motor 178 subsequently operates to pick up head 101 and to hold it in a known vertical position relative the spin plane of disk drive 102, as this spin plane is established by the disk drive's spindle.

Figure 19:
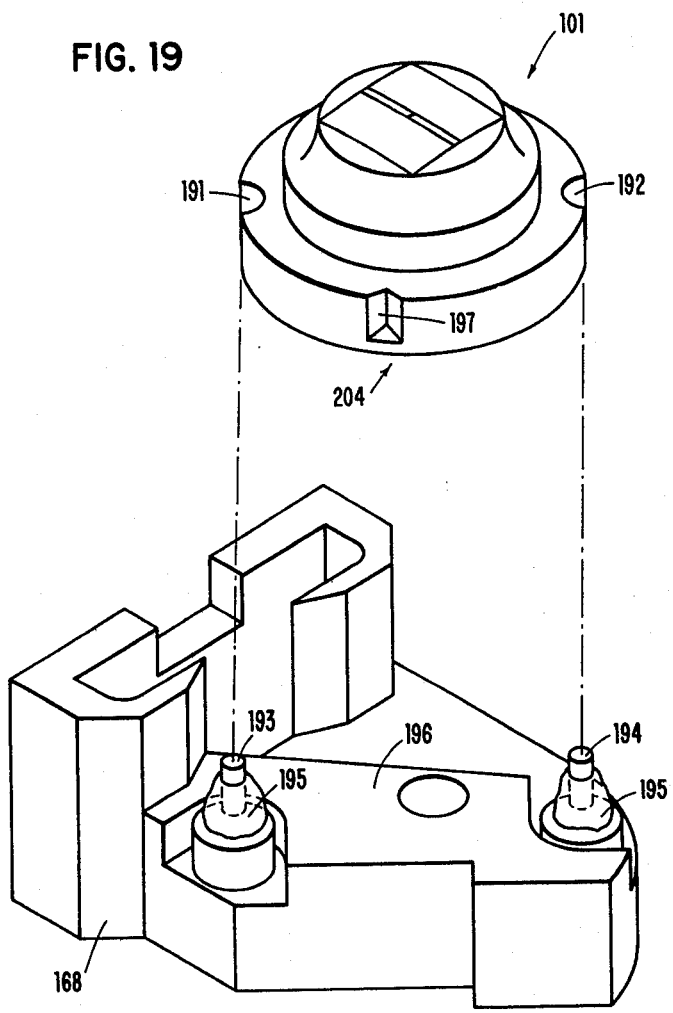
FIG. 19 shows the head of FIG. 1 in relation to the disk drive's movable carriage, and shows the adhesive which, when activated, clamps the head to the carriage, after the head has been properly positioned.

FIG. 19 shows head 101 exploded away from carriage 168. Head 101 includes two, 180°-disposed, locating channels 191 and 192 which mate with locating pins 193 and 194. Ultraviolet sensitive adhesive 195 is first placed on pins 193, 194, and perhaps on surface 196. The operator then loosely places head 101 on carriage 168, prior to placing disk drive 102 on table 106. Channels 191, 192 are larger than pins 193, 194, and this loose-fit enables head 101 to be adjusted without producing binding between the pins and the interior surfaces of the notches.

As an alternative, adhesive 195 may be added after head 101 is placed on pins 195. Also it may be desirable to add small glass beads or powder to the glue, in order to enhance the ability of the glue to span the gap between the members to be glued. This glass powder is preferably of the size range 45 microns in diameter.

Figure 18:
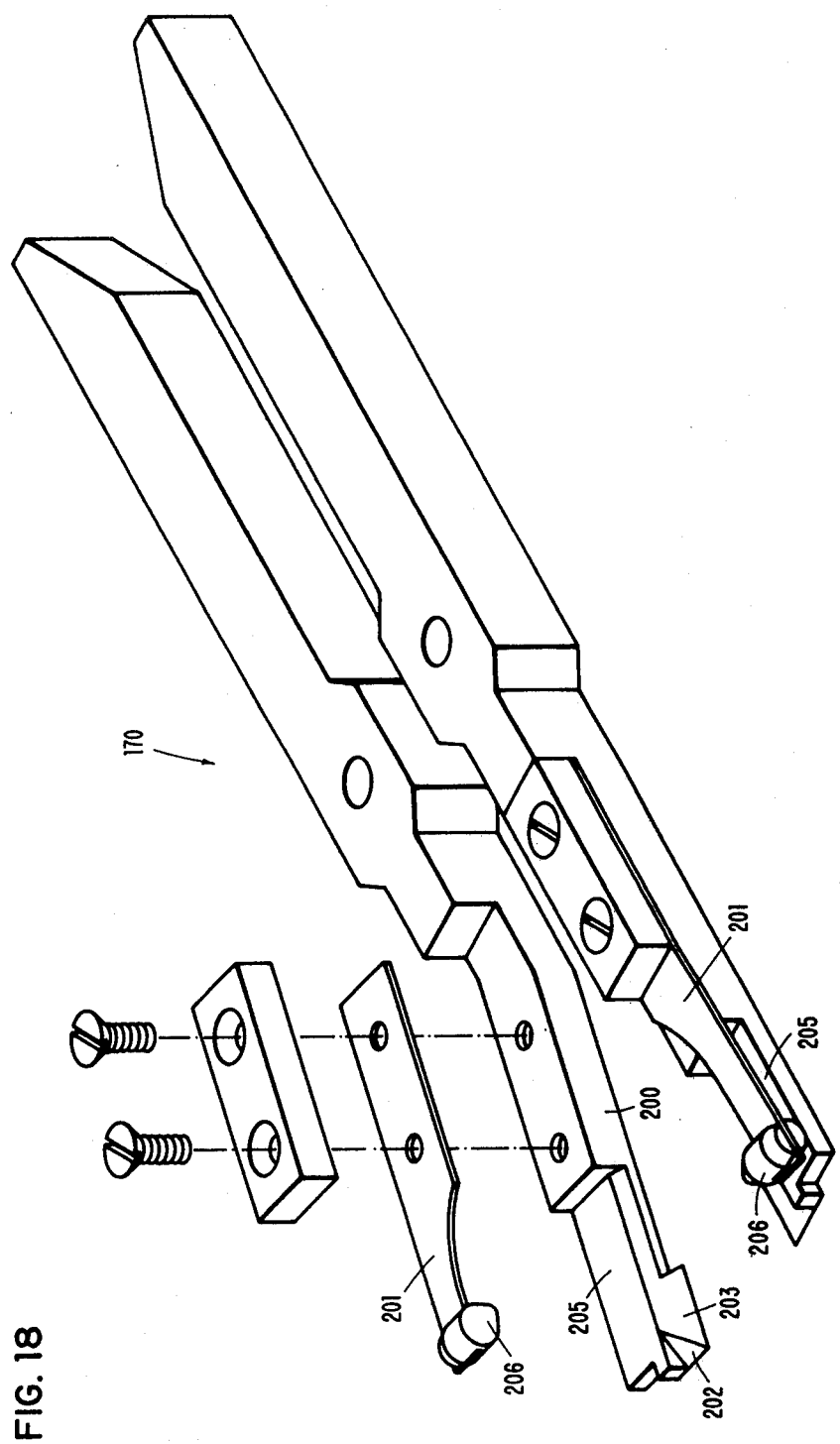
FIG. 18 shows the detail of the head holder/manipulator's two movable arms which support the head of FIG. 1.

Once the head is accurately positioned, the adhesive 195 is set by the application of ultraviolet energy. Head 101 also includes a pair of pick-up notches 197, one of which is shown in FIG. 19. These two notches are also 180° disposed. As seen in FIG. 19, each notch includes three interior flat surfaces which form a solid triangle. FIGS. 12 and 18 show how these notches cooperate with the head holder/manipulator arms 169, 170.

With this arrangement, the head is firmly gripped, and yet the glue interface is unobstructed, so that the glue can be flooded with ultraviolet light after the head has been adjusted.

With reference to FIG. 18, the construction and arrangement of the end of arms 169, 170 which support head 101 will now be described.

The ends of holder/manipulator arms 169, 170 which cooperate with head 101, and specifically the head's two pick-up notches 197, are identical in construction and function. Each arm includes a rigid member 200 and a top-located spring arm 201. Member 200 includes two head-pick-up ramp surfaces 202 and 203 which cooperate with the underside of head 101, in the general location indicated by numeral 204 in FIG. 19. As these ends of arms 169, 170 swing together, ramps 202, 203 cause the bottom of the head to be lifted and placed on the two horizontal surfaces 205 of arms 169, 170. Surfaces 205 occupy a common plane which is parallel to the spin-plane of the master disk. It is surfaces 205 which accurately locate head 101. Spring arms 201 include a locating button 206 which is deflected up into the apex of solid triangle 197 (FIG. 19) located 180° on opposite sides of head 101. In this manner, arms 201 force head 101 down onto surfaces 205.

Figure 20:
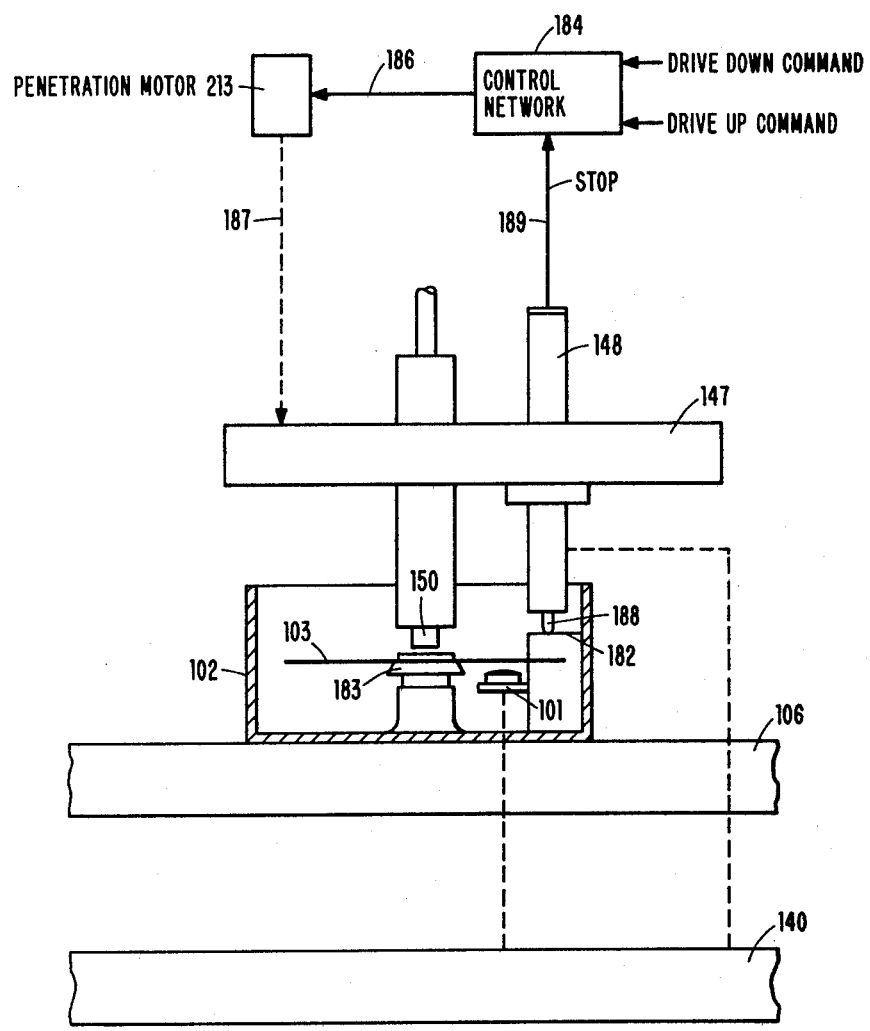
FIG. 20 is used to explain how the head's penetration into the master disk is controlled in the apparatus of FIGS. 9–11.

FIG. 20 discloses the manner in which penetration motor 213 (also see FIG. 9) produces the correct relative, vertical movement between movable master disk 103 and stationary head 101, in order to achieve a desired penetration of the disk's spin-plane by the head.

Remember that table 106 floats vertically due to the operation of weight 151. Head 101 and sensor 148 cannot move vertically because they are both fastened to base plate 140, as represented by the broken lines in FIG. 20. Table 147 can be driven vertically downward by operation of penetration motor 213.

Disk drive 102 includes an accurately located, horizontal reference surface 182. Surface 182 is accurately located, in the vertical direction, relative the disk's spin-plane, as this spin-plane is established by disk drive spindle 183. The spindle is accurately vertically-located relative datum surface 182. Sensor 148 engages surface 182. With motor drive shaft 150 disengaged from spindle 183, as shown, the sensor's movable output plunger 188 is retracted into sensor 148 due to the interference between surface 182 and plunger 188.

In order to produce the desired disk penetration by stationary head 101, the operator activates signal 184, a drive-down command to control network 185. This network's output 186 now energizes motor 213. The motor's mechanical output, represented by arrow 187, now causes table 147 to begin moving down. Motor 110, and its output shaft 150, are carried by table 147 and also move down.

After a short distance of such movement, shaft 150 encounters spindle 183. Sensor 148 has not disengaged from surface 182 at this time. However, plunger 188 has moved downward out of the sensor housing. Motor 213 continues to operate, pushing table 147 down. Table 106 now also moves down because it is pushed by the 150, 183 interference. Tables 106 and 147 are now both moving down, as is disk 103 and plunger 188.

When the desired penetration of disk 103 by head 101 has been achieved, plunger 188 has moved vertically downward, out of the housing of sensor 148, and the sensor issues a stop command on conductor 189. Network 185 is now controlled to deenergize motor 213. Tables 106 and 147 now reside in their respective positions until head 101 is aligned by operation of the five-motor stack 114–118, whereupon the head is clamped to the disk drive's head carriage 168 (FIG. 12), as by the use of the aforementioned ultraviolet sensitive glue.

After the adjusted head has been clamped, motor 178 (FIG. 13) of the head holder/manipulator is energized, thus causing arms 169, 170 to disengage from the head. The operator now actuates a drive-up command on conductor 190, and control network 185 energizes motor 213 to raise table 147. Table 106 follows, until a stop is encountered. Further upward movement of table 147 allows the operator to remove aligned drive 102, and replace it with another drive to be aligned.

Ideally, the operator removes an adjusted drive 102 by moving it to the left, as shown in top view FIG. 12. Mechanical stops (not shown) may be placed on table 106 to guide the drive during such movement.

In the alternative, radial motor 115 and tangential motor 114 may be energized to move the head holder/manipulator away from the disk drive. When another drive has been manually placed, and properly corner-registered on table 106, these two motors would then be energized to move the head holder/manipulator into position where energization of its actuator 178 causes arms 169, 170 to grip that new disk drive's loosely disposed head 101, as seen in top view FIG. 12.

Aforesaid motors 114–118, and motor 213 can be any of a number of commercially available, fine-resolution stepper motors.

A preferred arrangement for coupling motor shaft 150 to master alignment disk 103 is shown in FIG. 17, where the disk's two-part metal hub 210, 211 is shown resting on the disk drive's spindle 183. Hub part 210 includes one pin-receiving hole 311 which mates with a pin 212 carried by motor shaft 150. In this way, should one elect to use a motor tachometer to generate FIG. 2's track 21-23, the position of pulse 22 is accurately determined relative alignment data track 20. Pin 212 also provides the rotational drive force to disk 103, as a metal ball 213 ensures compliance between motor shaft 150 and the various disk drives 102 to be aligned. An important feature of this arrangement is that the center of ball 213 lies both in the spin-plane of disk 103 and on spin axis 109.

Figure 21:
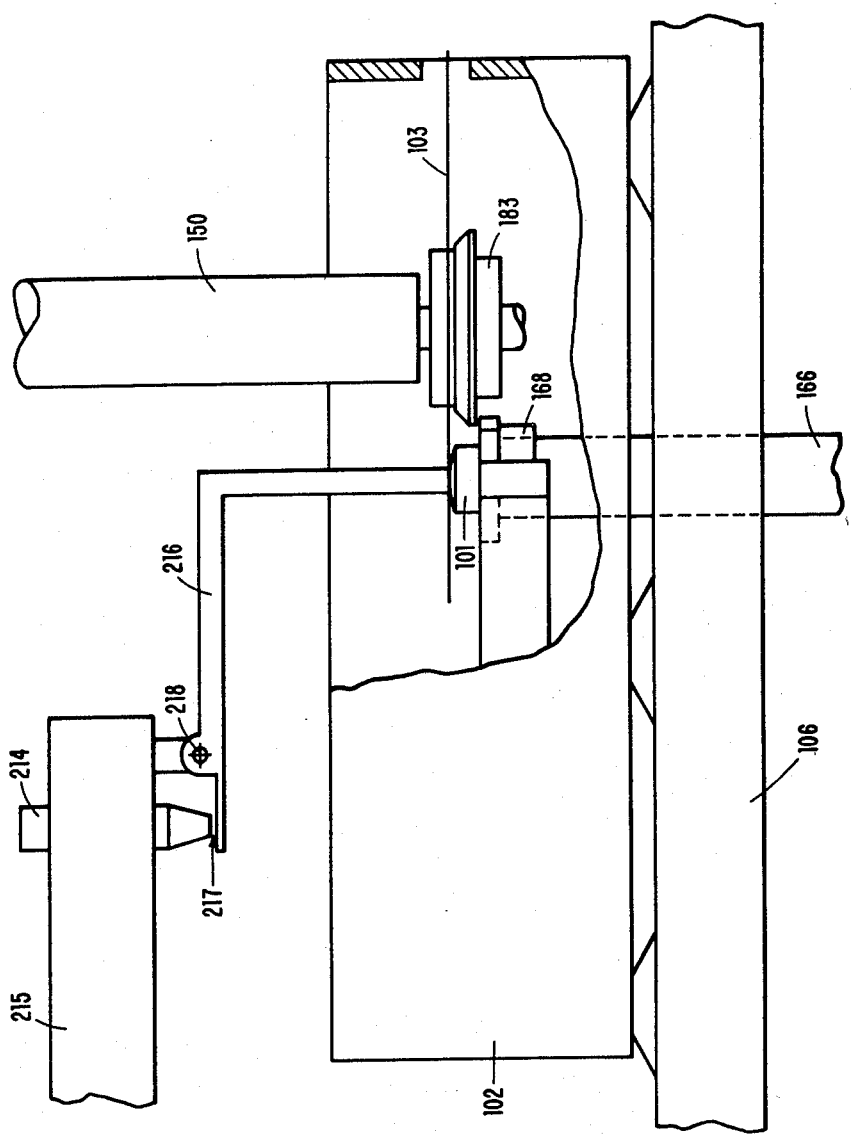
FIG. 21 shows yet another way to achieve head penetration movement along FIG. 1's axis 132.

With reference to FIG. 21, yet another way to achieve head penetration movement 132 will now be described. In this view, disk drive 102, whose head 101 is to be adjusted, is held by table 106, as the head is held by head holder/manipulator 166 (shown in outline form for convenience, and better seen in FIGS. 12 and 13). Master alignment disk 103 rests on the drive's spindle 183. The disk drive's head carriage 168 (better seen in FIG. 12) is also shown in outline form.

Head 101, and its holder/manipulator 168 are mounted at a fixed vertical position, as is a capacitance probe 214 which is mounted to support beam 215. Beam 215 also carries a pivoted, L-shaped metal arm 216 which, when head penetration of disk 103 is proper, forms a desired gap 217 to the lower end of probe 215.

In order to achieve this desired gap 217, drive 102 is moved vertically downward, as disk 103 spins. Arm 216 initially distorts the disk, and gap 217 does not exist when head 101 is below the disk's spin plane. As the stationary head moves relatively upward (due to downward movement of disk drive 102 and disk 103), arm 216 is engaged by the head and the intermediate disk, and arm 216 pivots about its pivot axis 218. Thus, the desired gap size 217 is established, whereupon downward movement of drive 102 is stopped.

In the aforesaid embodiments of the present invention it is contemplated that the various mechanical forces applied to the disk drive undergoing head alignment be substantially identical to those which will subsequently occur when the finished disk drive is put into use. An example of one such force is the force by which the aforesaid master disk is loaded onto the spindle of the disk drive undergoing alignment. Therefore, it is within the present invention to provide a substantially completely manufactured disk drive, absent final attachment of its head of course, and then to use, for example, (1) that drive's collet mechanism to clamp the aforesaid master disk to the drive's spindle, (2) that drive's pressure bail, or pad, to press the master disk down (at aforesaid point 31) onto the head undergoing alignment, and (3) the disk drive's motor to spin the master alignment disk. In this case of course, it is also necessary to provide a master alignment disk which not only carries alignment data track 24-28 (FIG. 2), but also carries position-information track 22,23. A fixture-mounted head then cooperates with position-information track 22,23 to provide the aforesaid signals which are used to establish alignment track position information such as the sectors of FIG. 3.

If those skilled in the art select automatic control of the aforesaid motors, use of the Motorola 6800 microprocessor is exemplary. The programs which support the aforesaid control of the head alignment motors, in accordance with the read-signal derived from the head being aligned, can take a great number of forms. As an aid to those skilled in the art in preparing a program to implement the present invention, the following program module implements the aforesaid radial alignment function using the Motorola 6800.

In this program module, memory locations are accessed in order to compute (1) the average head-signal magnitude derived from FIG. 2's data 25 (hereinafter designated R25), and (2) the average head-signal magnitude derived from FIG. 2's data 26 (hereinafter designated R26). In both cases, the average is for one 360° revolution of the master disk's data track. The program module then computes the value $$\frac{R25 - R26}{R25 + R26}$$

The magnitude of this computation is indicative of the distance that the head should be moved along radius 29 in order to achieve the condition where R25 equals R26. The plus or minus sense of this computation is indicative of the direction that the head should be moved.

```
            SPC
**  PROCESS RADIAL  DATA  **
RDATA       EQU     *               GET RADIAL AVERAGES
            SPC                     \
            LDX     #RA1SUM
CLRA1S      CLR     0,X             CLEAR RA1SUM AREA
            INX
            CPX     #RA1SUM+16
            BNE     CLRA1S
            LDX     #RA2SUM
CLRA2S      CLR     0,X             CLEAR RA2SUM AREA
            INX
            CPX     #RA2SUM+16
            BNE     CLRA2S
            SPC
            LDX     #SUMS
ADDRA1      LDA A   1,X             ADD UP RADIAL 1 DATA
            ADD A   RA1SUM+3        PUT IN RA1SUM
            STA A   RA1SUM+3        LOW BYTE
            LDA A   0,X
            ADC A   RA1SUM+2
            STA A   RA1SUM+2        SECOND BYTE
```

```
                LDA A       #$0
                ADC A       RA1SUM+1
                STA A       RA1SUM+1      THIRD BYTE
                LDA A       #$0
                ADC A       RA1SUM
                STA A       RA1SUM        FOURTH BYTE
                SPC
                LDA A       #12
RA1D12          INX                       INCREMENT X REG BY 12
                DEC A                       POINTS TO NEXT RADIAL 1 AREA
                BNE         RA1D12
                SPC
                CPX         #SUMS+180     CHECK END
                BNE         ADDRA1
                SPC
                LDX         #SUMS+2
ADDRA2          LDA A       1,X           ADD UP RADIAL 2 DATA
                ADD A       RA2SUM+3      PUT IN RA2SUM
                STA A       RA2SUM+3      LOW BYTE
                LDA A       0,X
                ADC A       RA2SUM+2
                STA A       RA2SUM+2      SECOND BYTE
                LDA A       #$0
                ADC A       RA2SUM+1
                STA A       RA2SUM+1      THIRD BYTE
                LDA A       #$0
                ADC A       RA2SUM
                STA A       RA2SUM        FOURTH BYTE
                SPC
                LDA A       #12
RA2D12          INX                       INCREMENT X REG BY 12
                DEC A                       POINTS TO NEXT RADIAL 2 AREA
                BNE         RA2D12
                SPC
                CPX         #SUMS+182     CHECK END
                BNE         ADDRA2
                SPC
                LDA A       #195          SET UP DIVISOR
                STA A       RA1SUM+7
                STA A       RA2SUM+7
                LDX         #RA1SUM       POINT TO DIVIDEND
                JSR         DIV32         FIND AVERAGE
                LDX         #RA2SUM       POINT TO DIVIDEND
                JSR         DIV32         FIND AVERAGE
                LDA A       RA2SUM+11     GET DIFFERENCE IN AVERAGES
                LDA B       RA2SUM+10
                SUB A       RA1SUM+11
                SBC B       RA1SUM+10
                STA A       RADDIF+1
                STA B       RADDIF
                SPC
                LDA A       RA2SUM+11     GET SUM OF TWO AVERAGES
                LDA B       RA2SUM+10
                ADD A       RA1SUM+11
                ADC B       RA1SUM+10
                STA A       RADSUM+1
                STA B       RADSUM
```

```
        SPC
        LDA A   RADDIF      SAVE SIGN
        AND A   #$80
        BEQ     POSR
        LDA B   #'2
        STA B   SIGNR       IN SIGNR
        NEG     RADDIF      TWO BYTE TWO'S COMPLEMENT
        NEG     RADDIF+1            "
        BCC     TWSOKR              "
        DEC     RADDIF              "
TWSOKR  BRA     MULTR
POSR    LDA B   #'1
        STA B   SIGNR
**  DIVIDE DIFFERENCE IN SUMS BY SUM OF SUMS  **
        SPC
MULTR   LDX     #1000
        STX     INBUFF
        LDX     RADDIF
        STX     INBUFF+2    MULTIPLY DIFF BY 1000
        LDX     #INBUFF
        JSR     MUL16
        SPC
        LDX     INBUFF+6
        STX     INBUFF+2    MOVE PRODUCT TO DIVIDEND SLOT
        LDX     INBUFF+4
        STX     INBUFF
        SPC
        LDX     RADSUM
        STX     INBUFF+6    MOVE RADSUM TO DIVISOR SLOT
        LDX     #0
        STX     INBUFF+4    HIGH WORD IS 0
        LDX     #INBUFF
        JSR     DIV32       FIND % DIFFERENCE
        SPC
        LDA A   INBUFF+11
        STA A   PRADIF+1    PUT % DIFF IN PRADIF
        LDA A   INBUFF+10
        STA A   PRADIF      HIGH BYTE
        LDX     #145
        STX     INBUFF
        LDX     PRADIF
        STX     INBUFF+2    1.45 TIMES PRADIF=MICROMETERS
        LDX     #INBUFF
        JSR     MUL16
        SPC
        LDX     INBUFF+6
        STX     INBUFF+2    MOVE PRODUCT TO DIVIDEND SLOT
        LDX     INBUFF+4
        STX     INBUFF
        SPC
        LDX     #100
        STX     INBUFF+6    DIVIDE BY 100
        LDX     #0
        STX     INBUFF+4    HIGH WORD IS 0
        LDX     #INBUFF
        JSR     DIV32       FIND NO. OF MICROMETERS
        SPC
        LDA A   INBUFF+11
```

```
         STA  A    PRADIF+1       PUT ANSWER IN PRADIF
         LDA  A    INBUFF+10
         STA  A    PRADIF         HIGH BYTE
         LDA  A    INBUFF+15      GET REMAINDER
         CMP  A    #50            SEE IF REM. IS OVER .5
         BLT       RADDO
         LDA  A    PRADIF+1
         ADD  A    #1             ADD 1 TO LOWER BYTE
         STA  A    PRADIF+1
         LDA  A    PRADIF
         ADC  A    #0             ADD CARRY IF THERE IS ONE
         STA  A    PRADIF
RADDO    RTS
```

While the invention has been particularly shown and described with reference to preferred embodiments thereof, it will be understood by those skilled in the art that various changes in form and details may be made therein without departing from the spirit and scope of the invention.

What is claimed is:

1. In an apparatus used to operatively position the head of a flexible disk drive relative the drive's movable head carriage, during manufacture of the disk drive;
   a master data disk adapted to be mounted on the spindle of the disk drive whose head is to be aligned;
   an alignment data format carried by said disk as a circular data track at track N of the disk's multiple-track format,
   said data format comprising multiple, repeating three-data groups about the 360° circumference of the data track;
   a movable head holder/manipulator adapted to loosely hold the head at the location of a fixed-position disk radius, and relative to the disk drive's movable head carriage, as the head carriage is positioned to access the data of track N, such that the intersection of the center line of track N and said disk radius defines a point in space to which the head's transducing gap is to be aligned;
   motor means supporting said holder/manipulator; and
   movement control means responsive to the head output signal derived from reading track N, and operative as a result of said output signal to control said motor means to (1) move the head gap in a direction generally normal to the fixed-position radius, (2) center the head gap on track N, and (3) align the head gap parallel to the fixed-position radius, the improvement comprising:
   circuit means operable to derive a separate output signal for each of track N's repeating three-data groups, and including means to average the multiple output signals, and to control said motor means in accordance with said average.

2. The apparatus of claim 1, wherein said circuit means including means operable to define an acceptable signal for at least one of said data groups, and to disregard unacceptable signals when deriving said average signal.

3. The apparatus of claim 1 wherein said data groups comprise a first group of magnetic transitions for effecting movement (1), including transitions which are normal to and centered on track N,
   a second group of magnetic transitions for effecting movement (2), including first transition portions normal to and positioned on one side of the center line of track N, and second transition portions normal to and positioned on the other side of the center line of track N,
   and a third group of magnetic transitions for effecting movement (3), including two transition portions which are generally centered on track N but are inclined at opposite but generally equal angles to the track center line,
   said apparatus including a disk-position signal generator,
   wherein said circuit means is responsive to the time of occurrence of said first data group at the gap of the head to be adjusted, as this time is compared to a unique disk position, said circuit means responding to this time in order to derive a signal operable to control said motor means in order to achieve movement (1).

4. The apparatus defined in claim 1 wherein said disk position generator provides a clock signal whose repetition rate is a function of the rotational speed of said disk, and counter means responsive to said clock signal and operable to generate a count which is a function of the time difference between the occurrence of said first data group at said head gap and the occurrence of said unique disk position, said time difference comprising a signal operable to control said motor means in order to achieve said movement (1) in bidirectional fashion.

5. The apparatus defined in claim 4 wherein said circuit means includes validity checking means responsive to the absence as well as the presence of said first data group at said head gap, in relation to the time of occurrence of said unique disk position, in order to determine if said time difference is a valid measure of the location of said head gap generally normal to the fixed-position radius.

6. The apparatus defined in claim 5 wherein said circuit means counts said clock as a function of the occurrence of said unique disk position, and as a function of the occurrence of said first data group at said head gap, and compares these two counts to generate a signal whose magnitude is the necessary distance for movement (1), and whose sense is the necessary direction for movement (1), and sums these two counts to determine if the correct number of clock transitions have been counted, an incorrect number being indicative of invalid data.

7. The apparatus defined in claim 6 including circuit means responsive to the amplitude of the two transition portions of said second and third groups of magnetic transitions, as these transitions are read by said head, and operable to derive an amplitude-comparison signal to control said motor means in order to achieve movements (2) and (3).

8. The apparatus defined in claim 1 wherein each individual one of said three-data groups is contained in a length of said data track which is divided into equal length sectors, M in number;
   wherein a first of said data groups comprises magnetic transitions occupying one sector and one normal to and centered on track N;
   wherein a second of said data groups comprises first magnetic transition portions occupying a second sector and one normal to and positioned to one side of the center line of track N, and second magnetic transition portions occupying a third sector and one normal to and positioned to the other side of center line of track N;
   wherein a third of said data groups comprises first magnetic transition portions occupying a fourth sector and are centered on track N but inclined thereto, and second magnetic transition portions occupying a fifth sector and are centered on track N but inclined oppositely thereto;
   said five sectors being separated by track sectors which do not contain magnetic transitions;
   and including a disk position track having (1) a signal defining the beginning of a 360° revolution of said alignment data format, and (2) repetitive clock pulses which define at least the boundaries and middle of each of said sectors.

9. The apparatus of claim 8 wherein said circuit means is responsive to the time of occurrence of said signal defining the beginning of the alignment data format, as compared, and the occurrence of said first data group at the gap of the head to be adjusted, said comparison being implemented by counting said clock pulses, said circuit means responding to this comparison in order to derive a signal which achieves movement (1).

10. The apparatus of claim 9 including counter means responsive to said clock pulses wherein the absence of a known number of pulses upon making said comparison results in the rejection of said comparison as valid data with which to implement movement (1).

11. The apparatus of claim 10 wherein said circuit means responds to said signal defining the beginning of said alignment data format, and to the following clock pulses, in order to locate the physical sector positions of said two transition portions of said second and third groups of magnetic transitions, said circuit means being operable to derive an amplitude-comparison signal from the defined sectors in order to achieve movements (2) and (3).

* * * * *